(12) United States Patent
Wescott et al.

(10) Patent No.: US 7,345,136 B2
(45) Date of Patent: Mar. 18, 2008

(54) WATER-RESISTANT VEGETABLE PROTEIN ADHESIVE DISPERSION COMPOSITIONS

(75) Inventors: James M. Wescott, Waunakee, WI (US); Charles R. Frihart, Dane, WI (US)

(73) Assignees: Heartland Resource Technologies LLC, Pasadena, CA (US); USDA, Washington, DC (US)

(*) Notice: Subject to any disclaimer, the term of this patent is extended or adjusted under 35 U.S.C. 154(b) by 311 days.

(21) Appl. No.: 11/099,175

(22) Filed: Apr. 4, 2005

(65) Prior Publication Data
US 2005/0277733 A1 Dec. 15, 2005

Related U.S. Application Data

(60) Provisional application No. 60/562,393, filed on Apr. 15, 2004, provisional application No. 60/560,133, filed on Apr. 6, 2004.

(51) Int. Cl.
C09J 189/00 (2006.01)
C08H 1/00 (2006.01)
D21J 1/00 (2006.01)
B32B 21/02 (2006.01)

(52) U.S. Cl. .................... 528/230; 528/129; 528/137; 528/268; 528/422; 527/200; 527/204; 527/205; 527/206; 106/124.1; 106/125.1; 106/127.1; 106/131.1; 106/132.1; 106/150.2; 106/155.2; 106/156.3; 106/156.5

(58) Field of Classification Search ............ 106/124.1, 106/125.1, 127.1, 131.1, 132.1, 150.2, 155.2, 106/156.3, 156.5; 527/200, 204, 205, 206; 528/129, 137, 230, 268, 422
See application file for complete search history.

(56) References Cited

U.S. PATENT DOCUMENTS

| | | | |
|---|---|---|---|
| 2,457,108 A | 12/1948 | Baker et al. | |
| 2,681,290 A | 6/1954 | Baker et al. | |
| 3,264,243 A | 8/1966 | Krieriem | |
| 3,619,222 A | 11/1971 | Werle et al. | |
| 3,950,593 A | 4/1976 | Bomball et al. | |
| 4,185,146 A | 1/1980 | Burke | |
| 4,192,783 A | 3/1980 | Bomball et al. | |
| 4,352,692 A | 10/1982 | Krinski et al. | |
| 4,554,337 A | 11/1985 | Krinski et al. | |
| 4,568,714 A | 2/1986 | Overholt | |
| 4,687,826 A | 8/1987 | Steinmetz et al. | |
| 4,689,381 A | 8/1987 | Krinski et al. | |
| 4,713,116 A | 12/1987 | Krinski et al. | |
| 4,942,191 A | 7/1990 | Rogers | |
| 4,961,788 A | 10/1990 | Krinski et al. | |
| 4,997,682 A | 3/1991 | Coco | |
| 5,328,687 A | 7/1994 | Leung et al. | |
| 5,344,871 A | 9/1994 | Timm et al. | |
| 5,514,371 A | 5/1996 | Leung et al. | |
| 5,514,372 A | 5/1996 | Leung et al. | |
| 5,571,316 A | 11/1996 | Gill | |
| 5,575,997 A | 11/1996 | Leung et al. | |
| 5,582,834 A | 12/1996 | Leung et al. | |
| 5,593,625 A | 1/1997 | Riebel et al. | |
| 5,607,633 A | 3/1997 | Sleeter et al. | |
| 5,624,669 A | 4/1997 | Leung et al. | |
| 5,635,123 A | 6/1997 | Riebel et al. | |
| 5,656,129 A | 8/1997 | Good et al. | |
| 5,684,114 A | 11/1997 | Phillips et al. | |
| 5,766,331 A | 6/1998 | Krinski et al. | |
| 5,776,242 A | 7/1998 | Gill et al. | |
| 5,817,381 A | 10/1998 | Chen et al. | |
| 5,869,589 A | 2/1999 | Raynolds et al. | |
| 5,942,058 A | 8/1999 | Sleeter et al. | |
| 5,981,621 A | 11/1999 | Leung et al. | |
| 6,010,714 A | 1/2000 | Leung et al. | |
| 6,291,559 B1 | 9/2001 | Krinski et al. | |
| 6,306,997 B1 | 10/2001 | Kuo et al. | |
| 2003/0148084 A1 | 8/2003 | Trocino | |
| 2005/0222358 A1* | 10/2005 | Wescott et al. | ............. 527/205 |

FOREIGN PATENT DOCUMENTS

WO WO 01/59026 A2 * 8/2001

OTHER PUBLICATIONS

Abrahao et al., "*Utilization of residues of proteinic nature. I. New Process of Plastification of Proteins.*" Rev. quim. ind. (Rio de Janeiro) (1956), 25 (No. 295), p. 13-17; Chemical Abstracts 51:79307.

Akimasa et al., "*Adhesive film from animal and vegetable proteins,*" Japanese patent application JP 25 000871 A.; Chemical Abstracts 46:50661.

Kuo, M. et al., "*Properties of Wood/Agricultural Fiberboard Bonded wit Soybean-based Adhesives*" Forest Products Journal; (Feb. 1998) 48, 2, pp. 71-75.

Lorenz, L. et al. "*The Effect of Soy Protein Additions on the Reactivity and Formaldehyde Adhesive Resins,*" 1998, Forest Products Journal, vol. 49, (3):73-78.

Sun et al., "Shear Strength and Water Resistance of Modified Soy Protein Adhesives, Journal of the American Oil Chemists Society," vol. 76, No. 8 (1999) pp. 977-980.

PCT Application PCT/US2005/011239 filed on Apr. 4, 2005.

* cited by examiner

*Primary Examiner*—David M Brunsman
(74) *Attorney, Agent, or Firm*—Quarles & Brady LLP

(57) ABSTRACT

Water-resistant, protein-based adhesive dispersion compositions and methods for preparing them are provided. The adhesive dispersions are prepared by copolymerizing a denatured vegetable protein, such as soy flour, that has been functionalized with methylol groups with one or more reactive comonomers, and preparing an acidic dispersion of the adhesive. The adhesive dispersions exhibit superior water resistance, and can be used to bond wood substrates, such as panels or laminate, or in the preparation of composite materials.

19 Claims, No Drawings

WATER-RESISTANT VEGETABLE PROTEIN ADHESIVE DISPERSION COMPOSITIONS

RELATED APPLICATIONS

This application claims the benefit of U.S. Provisional Application No. 60/560,133, filed Apr. 6, 2004 and U.S. Provisional Application No. 60/562,393 filed Apr. 15, 2004. All above-referenced prior applications are incorporated by reference herein in their entirety and are hereby made a portion of this specification.

STATEMENT OF FEDERALLY SPONSORED RESEARCH AND DEVELOPMENT

This work is supported in part by the U.S. Department of Agriculture Forest Service under Cooperative Research and Development Agreement No. 02-RD-11111120-116. Accordingly, the U.S. Government has certain rights in this invention.

FIELD OF THE INVENTION

Water-resistant, protein-based adhesive dispersion compositions and methods for preparing them are provided. The adhesive dispersions are prepared by copolymerizing a denatured vegetable protein, such as soy flour, that has been functionalized with methylol groups with one or more reactive comonomers, and preparing an acidic dispersion of the adhesive. The adhesive dispersions exhibit superior water resistance, and can be used to bond wood substrates, such as panels or laminate, or in the preparation of composite materials.

BACKGROUND OF THE INVENTION

Ancient adhesives raw material choices were limited. Starch, blood, and collagen extracts from animal bones and hides were early adhesives sources. Later, suitable raw materials used in adhesives expanded to include milk protein and fish extracts. These early starch and protein-based adhesives suffered from a number of drawbacks, including lack of durability and poor water resistance.

Adhesives based on protein-containing soy flour first came into general use during World War I. To obtain suitable soy flour for use in these early adhesives, some or most of the oil was removed from soybean, yielding a residual soy meal that was then subsequently ground into extremely fine soy flour. The soy flour was then denatured and, to some extent, hydrolyzed to yield adhesives for wood bonding under dry conditions. However, these early soybean adhesives suffered from the same drawbacks as other early protein-based adhesives, and their use was strictly limited to interior applications.

In the 1920's, phenol-formaldehyde (PF) and urea-formaldehyde (UF) adhesive resins were first developed. Phenol-formaldehyde and, less frequently, modified urea-formaldehyde resins were exterior-durable, but high raw materials costs at that time limited their use. World War II contributed to the rapid development of these adhesives for water and weather resistant applications, such as exterior applications. However, the low cost protein-based adhesives, mainly soy-based adhesives, continued to be used in many interior applications.

After World War II, the petrochemical industry invested vast sums of money in research and development to create and expand new markets for petrochemicals. Within several years, the once costly raw materials used in manufacturing thermoset adhesives became inexpensive bulk commodity chemicals. In the 1960's, the price of petrochemical-based adhesives had dropped substantially, such that they displaced nearly all of the protein-based adhesives from the market.

SUMMARY OF THE INVENTION

It is conventional wisdom that water-soluble adhesives that retain their water solubility after drying or curing do not offer the exterior durable properties required in many composite panel applications, and will wash away from the substrate or undergo processes involving complex debonding mechanisms. Many of the petrochemical based adhesives on the market today are initially water soluble, or at least dispersed in water, and then become water insoluble after proper conversion into the crosslinked thermoset.

Accordingly, a water-soluble adhesive dispersion that also possesses water durable bonds to inhibit cohesive failure is desirable.

Past attempts to combine the soy protein with the phenol-formaldehyde resins have generally been unsatisfactory in producing a suitable adhesive that can compete with the standard phenol-formaldehyde resin in all aspects. For example, some resins are only suitable for use in two component systems that cure too quickly to use in making composites. Some resins do not exhibit satisfactory stability. Other resins do not provide good bond strength and require high caustic levels that lead to poor moisture resistance and bond degradation over time. Extra processing steps, high formaldehyde content of the adhesive, and poor moisture resistance in the bonded product can also limit the chance of commercial success. Accordingly, a protein-based adhesive or adhesive dispersion that exhibits similar performance characteristics is desirable.

Over the past several years, the cost of petrochemicals used as raw materials in thermoset resins has risen to the point where protein-based adhesives can now compete economically in the same markets that are today enjoyed by the thermoset adhesives. A protein-based adhesive dispersion that combines the cost benefits of a low cost raw material with the superior exterior durability characteristics of thermoset adhesives is therefore highly desirable.

In accordance with the preferred embodiments, a low cost soybean-based adhesive dispersion suitable for exterior use is provided. The adhesive dispersions can be prepared using a simple process. The process involves the denaturization of the soy protein and the modification and stabilization of the soy protein using aldehydes, such as formaldehyde. This stable protein can be blended with a formaldehyde curable resin, such as phenol-formaldehyde, urea-formaldehyde, or melamine-formaldehyde resin, either at the adhesive manufacturer's plant or at the adhesive user's plant. The resulting adhesive is then combined with an acid to yield an acidic dispersion.

The adhesive dispersions of preferred embodiments can be prepared by copolymerizing methylolated, denatured soybean flour with selected comonomers. Suitable comonomers include those currently used in thermoset adhesives, such as phenol-formaldehyde, urea-formaldehyde, and melamine-formaldehyde resin. The cured adhesives when dispersed in acid offer superior water resistance.

Accordingly, in a first embodiment, a method of preparing a protein-based adhesive dispersion is provided, the method including the steps of denaturing a protein, whereby a denatured protein is obtained; methylolating the denatured protein with a formaldehyde source, whereby a methylolated, denatured protein is obtained; copolymerizing the methylolated denatured protein with a comonomer under basic conditions to yield a protein-based adhesive, wherein the comonomer is selected from the group consisting of phenol, phenol formaldehyde, urea, urea formaldehyde, melamine, melamine formaldehyde, melamine urea formaldehyde, and mixtures thereof; and adding an acid to the protein-based adhesive until a pH of less than 6.0 is attained, whereby a protein-based adhesive dispersion is obtained.

In an aspect of the first embodiment, the method further includes the step of reacting the protein-based adhesive with additional formaldehyde under basic conditions.

In an aspect of the first embodiment, the method further includes the step of copolymerizing additional comonomer with the protein-based adhesive in the adhesive dispersion.

In an aspect of the first embodiment, the additional comonomer includes a polymeric methyl diphenyl diisocyanate.

In an aspect of the first embodiment, the additional comonomer includes a novolak resin.

In an aspect of the first embodiment, the protein includes a soy protein.

In an aspect of the first embodiment, the soy protein includes a soy flour.

In an aspect of the first embodiment, the soy flour has a particle size of about 80 mesh or less.

In an aspect of the first embodiment, the soy flour includes from about 0 wt. % to about 12 wt. % of an oil.

In an aspect of the first embodiment, the soy flour includes from about 30 wt. % to about 100 wt. % of a protein.

In an aspect of the first embodiment, the soy flour includes a soy isolate.

In an aspect of the first embodiment, denaturing is conducted in the presence of an alkali.

In an aspect of the first embodiment, the alkali includes sodium hydroxide or potassium hydroxide.

In an aspect of the first embodiment, the method further includes the steps of forming an aqueous, alkaline solution of the protein; and maintaining the solution at an elevated temperature, whereby a denatured protein is obtained.

In an aspect of the first embodiment, the solution includes from about 6 to about 20 wt. % sodium hydroxide.

In an aspect of the first embodiment, denaturing is conducted for about 48 hours or less and at a temperature of from about 20° C. to about 140° C.

In an aspect of the first embodiment, the step of methylolating is conducted in a basic solution at an elevated temperature.

In an aspect of the first embodiment, the formaldehyde source includes formaldehyde.

In an aspect of the first embodiment, methylolation is conducted at a temperature of from about 0° C. to about 100° C. for about 24 hours or less.

In an aspect of the first embodiment, the step of copolymerizing is conducted at an elevated temperature.

In an aspect of the first embodiment, a total amount of formaldehyde reacted includes from about 20 wt. % to about 30 wt. % of the total protein content of the flour.

In an aspect of the first embodiment, the comonomer includes phenol formaldehyde.

In an aspect of the first embodiment, the adhesive dispersion includes from about 10 wt. % to about 99 wt. % of the comonomer.

In an aspect of the first embodiment, the method further includes the step of preparing a comonomer in the presence of the methylolated, denatured protein.

In an aspect of the first embodiment, the method further includes the steps of preparing a comonomer; and thereafter blending the comonomer with the methylolated, denatured protein.

In an aspect of the first embodiment, the method further includes the step of blending additional comonomer into the methylolated, denatured protein.

In an aspect of the first embodiment, the adhesive dispersion has a pH of less than about 6.

In an aspect of the first embodiment, the adhesive dispersion has a solids content of from about 30 wt. % to about 60 wt. %.

In an aspect of the first embodiment, the adhesive dispersion has a cured resin water extraction amount of less than about 45%.

In an aspect of the first embodiment, the method further includes the step of adding a component selected from the group consisting of extenders, fillers, accelerators, catalysts, water, and mixtures thereof to the adhesive.

In an aspect of the first embodiment, the acid includes a mineral acid.

In an aspect of the first embodiment, the acid includes an organic acid.

In an aspect of the first embodiment, the acid includes sulfuric acid.

In an aspect of the first embodiment, the acid is selected from the group consisting of hydrochloric acid, formic acid, acetic acid, nitric acid, and phosphoric acid.

In an aspect of the first embodiment, the acid is added to the adhesive until a pH of from about 4 to about 5 is obtained.

In an aspect of the first embodiment, about 3.5 parts sulfuric acid is added per about 100 parts adhesive.

In an aspect of the first embodiment, the acid is added to the adhesive at a temperature of from about 0° C. to about 90° C.

In an aspect of the first embodiment, the method further includes the step of providing a solid substance; contacting the solid substance with the adhesive dispersion; and recovering a composite.

In an aspect of the first embodiment, the composite includes a fiberboard.

In an aspect of the first embodiment, the solid substance includes an agricultural material.

In an aspect of the first embodiment, the agricultural material is selected from the group consisting of corn stalk fiber, poplar fiber, wood chips, and straw.

In a second embodiment, an adhesive dispersion is provided prepared according to a method including the steps of denaturing a protein, whereby a denatured protein is obtained; methylolating the denatured protein with a formaldehyde source, whereby a methylolated, denatured protein is obtained; copolymerizing the methylolated denatured protein with a comonomer under basic conditions to yield a protein-based adhesive, wherein the comonomer is selected from the group consisting of phenol, phenol formaldehyde, urea, urea formaldehyde, melamine, melamine formaldehyde, melamine urea formaldehyde, and mixtures thereof; and adding an acid to the protein-based adhesive until a pH of less than 6.0 is attained, whereby a protein-based adhesive dispersion is obtained.

In a third embodiment, a composite board is provided including the adhesive dispersion prepared according to a method including the steps of denaturing a protein, whereby a denatured protein is obtained; methylolating the denatured protein with a formaldehyde source, whereby a methylolated, denatured protein is obtained; copolymerizing the methylolated denatured protein with a comonomer under basic conditions to yield a protein-based adhesive, wherein the comonomer is selected from the group consisting of phenol, phenol formaldehyde, urea, urea formaldehyde, melamine, melamine formaldehyde, melamine urea formaldehyde, and mixtures thereof; and adding an acid to the protein-based adhesive until a pH of less than 6.0 is attained, whereby a protein-based adhesive dispersion is obtained.

In an aspect of the third embodiment, the composite board further includes a material selected from the group consisting of wood fiber, wood flakes, wood board, wood veneer, and wood particles.

In an aspect of the third embodiment, the composite board further includes a wax.

In a fourth embodiment, an adhesive dispersion is provided, the dispersion including an acid, the adhesive including the reaction product of a copolymer of a vegetable protein having a plurality of methylol groups and at least one comonomer.

In an aspect of the fourth embodiment, the adhesive dispersion further includes at least one coreacting prepolymer.

In an aspect of the fourth embodiment, the comonomer includes one or more methylol groups.

In an aspect of the fourth embodiment, the coreacting prepolymer includes one or more methylol groups.

In an aspect of the fourth embodiment, the vegetable protein includes soy protein.

In an aspect of the fourth embodiment, the soy protein includes soy isolate.

In an aspect of the fourth embodiment, a soymeal having a protein content of from about 40 wt. % to about 50 wt. % and an oil content of less than about 11 wt. % includes the soy protein.

In an aspect of the fourth embodiment, the comonomer is a methylol compound selected from the group consisting of dimethylol phenol, dimethylol urea, tetramethylol ketone, and trimethylol melamine.

In an aspect of the fourth embodiment, the coreacting prepolymer includes phenol formaldehyde.

In a fifth embodiment, an adhesive dispersion is provided, the dispersion including an acid, the adhesive including the reaction product of a copolymer of a vegetable protein having a plurality of methylol groups, and at least one comonomer, wherein the adhesive includes less than about 2.5 wt. % free phenol and less than about 1 wt. % free formaldehyde.

DETAILED DESCRIPTION OF THE PREFERRED EMBODIMENT

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

The processes of preferred embodiments involve the denaturization and stabilization of proteins for use in adhesive dispersion formulations. The stabilized proteins can be blended with one or more reactive comonomers, then dispersed in acid prior to use. The selection of the protein source, its denaturization and stabilization, and the selection of and reaction with the comonomer can each contribute to the adhesive's performance.

The process for preparing durable vegetable protein-based adhesives from soy flour involves preparing the flour, denaturing the flour, methylolating the flour, and finally, copolymerizing the methylolated soy protein with a suitable comonomer, such as phenol or formaldehyde-modified phenol. Other suitable comonomers include, for example, urea, melamine, phenol, acetone, and any of their corresponding methylol derivatives. The adhesives can be prepared using the methylolated compounds as raw materials, or suitable compounds can be methylolated via reaction with formaldehyde as a step in the process of preparing the adhesive.

The Protein Source

The process employs a suitable protein source for the co-polymerization to form adhesive bonds. Protein sources having high protein contents, such as 40 wt. % or less up to about 100 wt. %, are generally preferred. Particularly preferred are protein contents of from about 45 wt. % to about 50, 55, 60, 65, 70, 75, 80, 85, 90, 95, or 100 wt. %. Higher protein content generally correlates with improved co-polymerization, resulting in the formation of strong adhesive bonds and good water resistance. While enriched protein sources are generally preferred, non-enriched protein sources can also be employed. Accordingly, many biomass materials with appreciable protein content are suitable for use in the preferred embodiments.

While the preferred embodiments refer to soybean flour as the protein source, other protein sources are also suitable for use, as will be appreciated by those of skill in the art. Soybean flour is generally preferred due its low cost and good protein content. Non-limiting examples of other sources of vegetable protein include, for example, nuts, seeds, grains, and legumes. These sources include, but are not limited to, peanuts, almonds, brazil nuts, cashews, walnuts, pecans, hazel nuts, macadamia nuts, sunflower seeds, pumpkin seeds, corn, peas, wheat, and the like. Other sources include protein-containing biomasses, such as waste sludge, manure, and composted manure. Additional and/or different processing steps from those described for preparing soymeal can be used in refining and separating a protein from a raw product of other protein sources, as will be appreciated by one skilled in the art. The processed proteins can be employed to produce adhesives acceptable for various applications.

Soy flour comprises a hull (8 wt. %), a hypocotyl axis (2 wt. %), and a cotyledon (90 wt. %). The soybean plant belongs to the legume family. There are typically 2-3 seeds per pod and as many as 400 pods per plant. The soy flour is prepared by grinding soy meal. There are several suitable processes for the generation of soy meal. Soy meal is typically obtained from soybeans by separating all or a portion of the oil from the soybean, for example, by solvent extraction, extrusion, and expelling/expansion methods.

In solvent extraction methods, soybeans entering the processing plant are screened to remove damaged beans and foreign materials, and are then comminuted into flakes. The soybean oil is removed from the flakes by extraction with a solvent, such as hexane. While hexane is generally preferred as a solvent, other suitable solvents or mixtures of solvents can also be employed. Suitable solvents include hexane, acetone, ethanol, methanol, and other solvents in which the oil to be extracted is soluble. Suitable extraction apparatus are well known in the art and can include, for example, countercurrent extractors. After the defatted flakes leave the extractor, residual solvent is removed by heat and vacuum. Soymeal produced by solvent extraction methods contains essentially no oil (<1 wt. %), from about 50 to about 60 wt. % protein, and from about 30 to about 35 wt. % carbohydrate.

In extrusion methods, after the soybeans are screened and flaked, the flakes are heated under conditions of pressure and moisture in an extrusion apparatus. Suitable extrusion apparatus are well known in the art, including, for example, horizontal screw extrusion devices. Soy meal from extrusion methods typically contains from about 5 to about 15 wt. % oil, preferably from about 8 to about 12 wt. % oil. The protein content of soy meal from extrusion methods typically contains from about 35 to about 55 wt. % protein, preferably from about 40 to about 48 wt. % protein.

Another method for producing soy meal is the expansion/expelling method. This method has gained in popularity over other methods because of the quality of the byproducts produced, as well as elimination of environmental hazards associated with solvent extraction methods. In the expansion/expelling method, the raw soybeans are fed through a series of augers, screeners, and controlled rate feeders into the expanders. The internal expander chambers and grinders create extreme temperature and pressure conditions, typically from about 150° C. to about 177° C. and from about 375 to about 425 psi. The oil cells of the bean are ruptured as the product, in slurry form, exits the expander and the pressure drops down to atmospheric pressure. The high frictional temperature cooks the meal and oil, yielding a high quality product. About half of the 12 wt. % moisture present in the raw soybean is released as steam as the slurry exits the expander. The water and steam mix inside the expander, keeping the slurry fluid as well as aiding in the cooking process. The hot soy meal slurry is then fed to a continuous oil expeller. The meal is squeezed under pressure and the free oil is expelled. The oil and the meal are then separated and recovered. The soy meal exits the press as a mixture of dry powder and chunks, which can be milled with a hammer mill, roller mill, or other suitable mill to an acceptable bulk density and consistency. The product can then be passed through a cooler where heat is extracted. The resulting expanded/expelled soymeal typically contains from about 7 to about 11 wt. % oil and from about 42 to about 46 wt. % protein, on a dry matter basis.

To produce a soy meal suitable for use in the adhesives of the preferred embodiments, it is preferably ground into fine flour. Typically, the dry extracted meal is ground so that nearly all of the flour passes through an 80 to 100 mesh screen. In certain embodiments, flour milled to pass through higher or lower mesh screen can be preferred, for example, about 20 mesh or less down to about 150 mesh or more, more preferably from about 25, 30, 35, 40, 45, 50, 55, 60, 65, 70, or 75 mesh to about 80, 85, 90, 95, 100, 110, 120, 130, or 140 mesh. In the preferred embodiments, the soy meal contains about 40 wt. % or more protein. However, soy meals with lower protein content can also be suitable in certain embodiments. Soy meals having various oil contents can be employed in the preferred embodiments.

Denaturization and Stabilization of the Protein

The soy protein in soybeans is primarily a globular protein consisting of a polypeptide chain made up of amino acids as monomeric units. Proteins typically contain 50 to 2000 amino acid residues per polypeptide chain. The amino acids are joined by peptide bonds between the alpha-carboxyl groups and the alpha-amino groups of adjacent amino acids, with the alpha-amino group of the first amino acid residue of the polypeptide chain being free. The molecular structures of soy proteins contain a hydrophilic region that is enclosed within a hydrophobic region, such that many of the polar groups are unavailable. It is the same forces that maintain the helical structure of the protein that are desirable for bonding. The globular shape of proteins in aqueous solution is a consequence of the fact that the proteins expose as small a surface as possible to the aqueous solvent so as to minimize unfavorable polar interactions with the water and to maximize favorable interactions of the amino acid residues with each other. The conformation of the protein is maintained by disulfide bonds and by non-covalent forces, such as van der Waals interactions, hydrogen bonds, and electrostatic interactions.

When a protein is treated with a denaturant, the conformation is lost because the denaturant interferes with the forces maintaining the configuration. The result is that more polar groups of the protein are available for reaction. In preparing the adhesives of the preferred embodiments, the soy protein is first denatured. The polar groups are uncoiled and exposed to facilitate the development of a good adhesive bond.

The denaturant can include any material capable of disrupting the intermolecular forces within the protein structure by breaking hydrogen bonds and/or cleaving disulfide bonds. Reagents that can be employed to cleave disulfide bonds include oxidizing agents, such as formaldehyde and sodium bisulfite, and other substances as are known in the art. Suitable denaturants include, but are not limited to, organic solvents, detergents, acids, bases, or even heat. Particularly preferred denaturants include sodium hydroxide, potassium hydroxide, other alkali and alkaline metal hydroxides, concentrated urea solutions, and mineral acids. In the preferred embodiments, the alkali or acid treatments are conducted at elevated temperatures. Preferably, metal hydroxides, such as sodium hydroxide, are employed due to their ability to elevate the pH to the desired level. A suitable pH contributes to proper solubility of the soy flour or other protein, as well as to catalysis of the copolymerization reaction with comonomers, such as phenol formaldehyde. The amount of denaturant employed is preferably the minimum amount that yields proper methylolation. Excess denaturant is generally not preferred, although in certain embodiments it can be acceptable or even desirable to employ excess denaturant. Most preferably, the denaturant is sodium hydroxide, which is preferably employed at an amount of from about 5 wt. % or less to about 40 wt. % or more, based on sodium hydroxide to protein, preferably from about 6, 7, 8, or 9 wt. % to about 30 or 35 wt. %, and most preferably from about 10, 11, 12, 13, 14, or 15 wt. % to about 16, 17, 18, 19, 20, 21, 22, 23, 24, or 25 wt. %. The amount of sodium hydroxide employed is preferably kept as low as possible, and the amount employed is preferably directly related to the amount of protein present in the flour. For a typical soy flour containing from about 40 to about 50 wt. % protein, the amount of sodium hydroxide is preferably from about 8 to about 12 wt. %. If the amount of sodium hydroxide is insufficient, inadequate methylolation can result, which in turn can result in premature gelation upon formaldehyde addition.

To aid in the solubility and compatibility of the soy flour, compatibilizing materials can be employed. These include, but are not limited to, ethylene glycol, poly(ethylene glycol), and other ionic and non-ionic surfactants as are known in the art.

In preferred embodiments, a phase transfer catalyst is added to the denaturing reaction mixture. The phase transfer catalyst serves to enhance the rate of reaction occurring in a two phase organic-aqueous system by catalyzing the transfer of water soluble reactants across the interface to the organic phase. Suitable phase transfer catalysts include polyethylene glycol, quaternary ammonium compounds, and the like. In a preferred embodiment, the phase transfer catalyst is tris (dioxa-3,6-heptyl)amine, commonly referred to as Thanamine or TDA-1 (available from Rhodia, Inc. of Cranbury, N.J.). In various embodiments, it is preferred to add a component to the reaction mixture that enhances the solubility of the protein, thereby facilitating the denaturing reaction. Certain antioxidants, including tertiary-butylhydroquinone (TBHQ) and butylated hydroxyanisole (BHA), are observed to increase the solubility of soy protein, however, other suitable solubility enhancers may also be used.

Denaturization can occur over a wide temperature range. The denaturization reaction can be carried out at temperatures from about 60° C. or lower to about 140° C. or higher, preferably from about 65 to 70° C. to about 100, 105, or 110° C., and most preferably from about 75, 80, or 85° C. to about 90 or 95° C.

The denaturization time is dependent on the amount of denaturant employed, the particle size of the flour or other protein source, and the reaction temperature. Preferably, the denaturization time is from about 1 minute or less to about 100 hours or more, preferably from about 2, 3, 4, or 5 minutes to about 3, 4, 5, 6, 7, 8, 9, 10, 11, 12, 18, 24, 30, 36, 42, 48, 54, 60, 66, or 72 hours, and most preferably from about 10, 15, 20, 25, or 30 minutes to about 40, 50, 60, 70 80, 90, 100, 110, or 120 minutes. Excessive temperatures, reaction times, and/or denaturant levels can lead to unacceptably high levels of hydrolysis, which in turn results in high extractables and poor water resistance of the cured adhesive. However, in certain embodiments, temperatures, reaction times, and/or denaturant levels outside of the preferred ranges can be tolerated, or even desired. Maintaining the proper balance of denaturant, temperature, and time of reaction yields a satisfactory denatured soy protein which can be employed in the preparation of durable copolymer adhesives.

Soy flour tends to foam during heating in water. Accordingly, it can be desirable to employ a suitable antifoam agent. It is preferred that the level of antifoam does not exceed 2% of the total soy. Preferably, from about 0.01 g or less to about 0.2 g or more of antifoam agent is employed per 150 g flour, more preferably from about 0.02, 0.03, 0.04, 0.05, 0.06, 0.07, or 0.08 g to about 0.09, 0.10, 0.11, 0.12, 0.13, 0.14, 0.15, 0.16, 0.17, 0.18, or 0.19 g antifoam agent per 150 g flour. Suitable antifoams include siloxanes, fatty acids, fatty acid salts, and other materials capable of reducing the surface tension of the soy flour in solution.

Formaldehyde can also be employed to improve the solubility and stability of the protein in the dissolved state.

The Soy Methylolation Reaction

The adhesives of the preferred embodiments are based on a solubilized protein. The solubilized protein is reacted with formaldehyde to form methylol derivatives. Methylolated proteins react with the comonomer to form thermoset adhesives.

After denaturing the soy flour, the next step in the preparation of the adhesives of the preferred embodiment is the stabilization of the denatured protein. This is accomplished by reacting the denatured protein with an aldehyde, for example, a formaldehyde generator, acetaldehyde, propionaldehyde, glyoxal, or mixtures thereof. The preferred embodiment employs formaldehyde or a formaldehyde generator to methylolate the protein. The methylolation (also referred to as hydroxymethylation) of the denatured protein's polypeptide chain yields a stabilized protein.

If the denatured soy protein is not subject to methylolation prior to condensation with suitable copolymers, the resin system can be very reactive at room temperature and offer poor viscosity stability, such as the two part adhesive systems employed in the "honeymoon" finger jointing process developed by Dr. Roland Kreibich. This reactivity is managed in order to provide a stable one-component resin system. Thus, the methylolation reaction is carried out prior to copolymerization by adding formaldehyde, or a latent source of formaldehyde, to the denatured soy protein.

The formaldehyde (or formaldehyde source) is added in an amount of from about 10 wt. % or less to about 60 wt. % or more to the soy flour, preferably from about 11, 12, 13, 14, or 15 wt. % to about 35 or 40 wt. %, and most preferably from about 20, 21, 22, 23, 24, or 25 wt. % to about 26, 27, 28, 29, or 30 wt. %. The methylolation reaction can be carried out under a variety of conditions, including various concentrations, temperatures, and reaction times. For stabilized proteins, concentrations of from about 20, 15, or 10 wt. % or less to about 50, 55, or 60 wt. % or more solids are acceptable, preferably about 21, 22, 23, 24, or 25 wt. % to about 26, 27, 28, 29, 30, 31, 32, 33, 34, or 35 wt. % are employed.

Suitable methylolation temperatures are from about 0° C. or less to about 140° C. or more, preferably from about 5, 10, 15, 20, 25, or 30° C. to about 95, 100, 105, or 110° C., and most preferably from about 30, 35, 40, 45 or 50° C. to about 55, 60, 65, 70, 75, 80, 85, or 90° C. The methylolation reaction occurs via reaction of the electrophilic aldehyde with a terminal amine of the protein or via reaction with the protein's amino acid nucleophilic side chains. Preferably, formaldehyde or latent sources of formaldehyde are employed; however, any electrophilic aldehyde capable of reacting with the nucleophilic components of the denatured soy flour can be employed.

Generally, over 28% of the total amino acid composition in soy protein contains nucleophilic side groups that are capable of reacting with formaldehyde to form a reactive soy methylol group that can be further copolymerized with suitable copolymers. Additionally, the electrophilic side group of tyrosine is also capable of reacting with formaldehyde to generate a reactive soy methylol group that can be further copolymerized with suitable copolymers. The amine nitrogens within the protein chains and the end group amines are also capable of reacting with formaldehyde to form reactive methylol intermediates. The denatured soy flour is methylolated to provide an adhesive with the reactivity, durability, and room temperature stability desired for a practical one-component soy based adhesive. For illustrative purposes, a typical end group and side chain methylolation reactions are shown below.

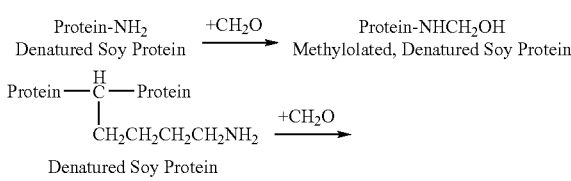

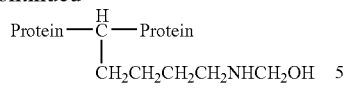

Methylolated, Denatured Soy Protein

Comonomer Reactions

The chemistries of the comonomer reactions are similar to those involved in curing the adhesives. Comonomers can be formed in situ with the stabilized protein, or can be formed separately and mixed with the stabilized protein in the methylolation or oligomerization reaction step. Suitable chemistries include phenol, melamine, urea, and combinations thereof reacting with formaldehyde or a formaldehyde generator. The process for making such resins is a two step process involving methylolation followed by condensation. These same two steps can be employed in conjunction with the soy flour based resin systems of preferred embodiments, along with an additional denaturization step prior to methylolation.

Methylolation Reaction

The methylolation reaction for many adhesive systems involves the reaction of a nucleophilic material with an electrophilic aldehyde. Typically, formaldehyde or latent sources of formaldehyde, such as paraformaldehyde, are employed. With phenol, the methylolation reaction involves the substitution of the phenol's ortho hydrogen(s) and/or the para hydrogen with hydroxymethyl groups. This reaction yields a mixture of mono-, di- and tri-substituted methylolated products. The reactivity of the para position is approximately 1.4 times greater than that of the ortho positions. However, since each phenol has two ortho positions but only one para position, substitution is seen more often at the ortho position. Similar reactions occur with other common nucleophilic starting materials, such as urea and melamine. These processes are often base-catalyzed to enhance the nucleophilicity of the starting material. For phenol, as the extent of methylolation increases, the pKa of the intermediate products decreases, which can result in large amounts of undesired, unreacted phenol in the final product. Several base catalyzed methylolation reactions are shown below.

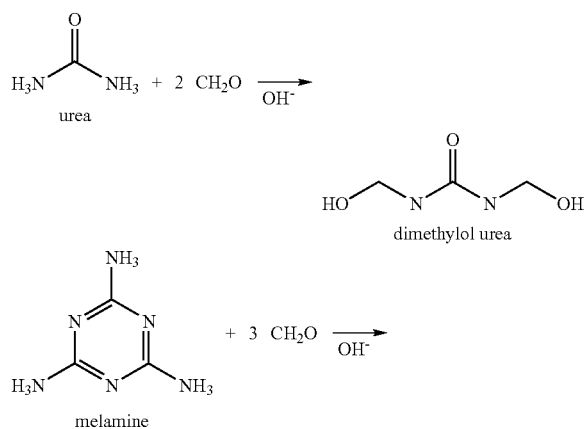

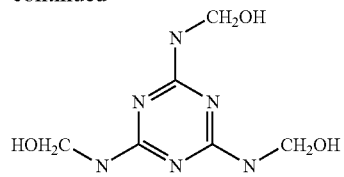

trimethylol melamine

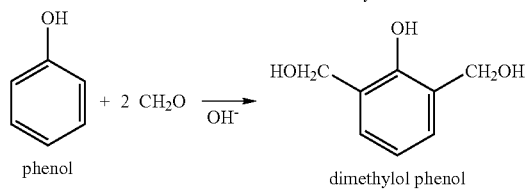

The methylolation process typically does not result in a substantial molecular weight increase in the resin. This step is more properly considered a process of adding functionality to the starting reactants to prepare them for the condensation step, wherein molecular weight increases and matrix development occurs.

Condensation

The condensation step is a process of increasing the molecular weight of the resin though a series of Mannich-type reactions involving the methylolated precursors. These reactions proceed in the same manner as other condensation or step-growth polymerizations. That is, the molecular weight is increased until gelation occurs. The condensation of any of the methylolated materials described above is readily carried out by either a chemically or thermally driven process. With urea, the condensation occurs under acidic conditions. For phenolic resins, the condensation can be accomplished under either acid or basic conditions.

It is generally preferred that high methylol containing materials (resoles) undergo the condensation reaction at a pH of from about 9 or less to about 12 or more. Low to no methylol containing phenolics (novolaks) undergo the condensation reaction under acidic conditions in the presence of additional latent sources of formaldehyde. For phenolic systems, the condensation reaction is much faster than the methylolation reaction under acidic conditions, whereas the opposite is true under alkaline conditions. While not wishing to be bound to any particular theory, it is generally believed that the condensation mechanism involves the condensation of two methylol groups to yield one molecule of water and an ether linkage. This ether linkage is considered to be very unstable and collapses quickly into a more stable methylene linkage liberating an additional molecule of formaldehyde that can further methylolate. Condensation can also take place between a methylol group and a reactive non-substituted ortho or para site on the phenolic ring or between two methylol groups. Examples of the condensation process are described below.

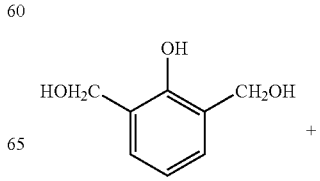

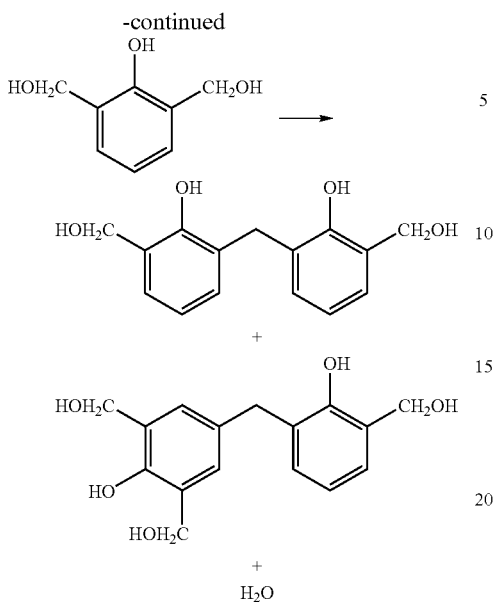

Copolymerization and Condensation of the Stabilized Protein and Comonomer

After methylolation of the denatured soy protein and, in certain embodiments, the comonomer, the next step in the preparation of the adhesives of the preferred embodiments involves condensation (also referred to as "resinification" or "curing") of the methylolated, denatured soy flour with itself and with suitable comonomers. Although the methylolated soy flour can be self-condensed to a certain degree, many of these bonds are often considered to be readily reversible and hydrolyzable, thus a suitable reactive comonomer is employed to increase the hydrolytic stability and thus increase the durability of the adhesive and the adhesive bond.

The copolymerization condensation can occur in various fashions. One of the reactions that can occur is the condensation of a protein hydroxymethyl group with either a hydroxy methylol group of phenol or a reactive ortho or para hydrogen of phenol. Both mechanisms result in the formation of the stable N—$CH_2$-phenol linkage.

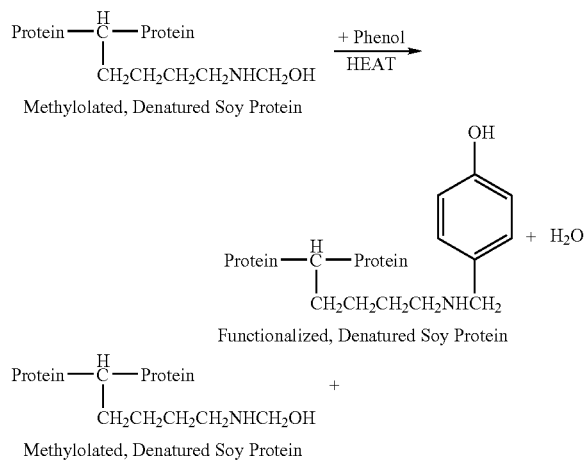

Copolymerization is also possible between two protein hydroxymethyl groups, yielding a protein-$CH_2$-protein methylene linkage. Any comonomer capable of reacting with the methylol protein that affords a durable non-hydrolyzable stable bond is suitable. Examples of suitable comonomers include, but are not limited to, phenol, urea, melamine urea, melamine, and any methylolated derivatives thereof. Additionally, isocyanates, such as polymeric methylenediphenyl diisocyanate, are also suitable comonomers.

The comonomers employed can have a variety of methylol functionalities and molecular weights. For phenol, the methylol functionality is from about 0 to about 3 moles or more methylol to phenol, preferably from about 0.1, 0.2, 0.3, 0.4, 0.5, 0.6, 0.7, 0.8, 0.9, 1.0, 1.2, 1.3, or 1.4 to about 2.6, 2.7, 2.8, or 2.9 moles, and most preferably from about 1.5, 1.6, 1.7, 1.9 or 1.9 to about 2.0, 2.1, 2.2, 2.3, 2.4, or 2.5 moles. The condensation reaction can be affected by the amount of acid or base present in the system. For phenol, it is preferred that the sodium hydroxide level in the copolymer be from about 0.01 moles or less to about 1.0 moles or more of sodium hydroxide phenol, preferably from about 0.02, 0.03, 0.04, 0.05, 0.06, 0.07, 0.08, 0.09, 0.10, 0.11, 0.12, 0.13, 0.14, 0.15, 0.16, 0.17, 0.18, or 0.19 moles to about 0.55, 0.60, 0.65, 0.70, 0.75, 0.80, 0.85, 0.90, or 0.95 moles, most preferably from about 0.20, 0.21, 0.22, 0.23, 0.24, 0.25, 0.26, 0.27, 0.28, 0.29, or 0.30 moles to about 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50 moles. Higher or lower alkalinities can be employed, depending upon the amount of denaturant used.

The pH of the final adhesive resin for optimal durability is generally from about 9 or less to about 12 or more, preferably from 9.1, 9.2, 9.3, 9.4, 9.5, 9.6, 9.7, 9.8, or 9.9 to about 11.6, 11.7, 11.8, or 11.9, most preferably from about 10, 10.1, 10.2, 10.3, 10.4, 10.5, 10.6, 10.7, 10.8, or 10.9 to about 11, 11.1, 11.2, 11.3, 11.4, or 11.5. If the pH of the adhesive is less than 9, additional base, such as sodium hydroxide, can be added to decrease the viscosity of the adhesive. If the final adhesive has a pH over 12, the resin may not properly cure, leading to poor performing resins. In certain embodiments, a pH of less than 9 or greater than 12 can be tolerated, or is even desirable. After the adhesive is formulated into the acid dispersion, then a pH of less than about 6 is preferred for the dispersion.

The introduction of the comonomer to the methylolated, denatured soy flour can be accomplished by either blending the two reactive components or by generating the reactive comonomer in-situ with the methylolated, denatured soy flour. This permits the final adhesive to be prepared from either a blend or in a one-pot process. Regardless of the mode of introduction of the comonomer, it is desirable to introduce small amounts of commoner into the methylolated, denatured soy flour prior to final addition of the total comonomer. This permits small amounts of low molecular weight copolymer to be formed and also functionalizes the methylolated, denatured soy flour such that it is more reactive toward additional comonomer added later through blending or prepared in situ in a one-pot process. Comonomer can be added before or after the acidic adhesive dispersion is formed. Preferably, the addition of comonomer, such as polymeric methyl diphenyl diisocyanate (PMDI) or novolak resin, occurs after the dispersion is formed.

The amount of comonomer added to the adhesive can be from 20 wt. % or less to 99 wt. % or more. For applications where durability is of less importance, an amount of from about 21, 22, 23, 24, 25, 26, 27, 28, or 29 wt. % to about 41, 42, 43, 44, 45, 46, 47, 48, 49, or 50 can be employed, preferably from about 30, 31, 32, 33, 34, or 35 to about 36, 37, 38, 39, or 40 wt. %. For applications where high durability is desired, from about 50, 51, 52, 53, 54, 55, 56, 57, 58, or 59 wt. % to about 71, 72, 73, 74, 75, 76, 77, 78, 79, or 80 wt. % can be employed, preferably from about 60, 61, 62, 63, 64, or 65 wt. % to about 66, 67, 68, 69, or 70 wt. %. A mixture of comonomers can also be employed.

The rate of copolymerization can be increased by the addition of cure accelerators or catalysts. Typical cure accelerators include propylene carbonate, ethyl formate, and other alpha esters. Catalysts, such as sodium or potassium carbonate, can also be added to increase the rate of reaction and also the resin solids content.

In a particularly preferred embodiment, in addition to a comonomer, the methylolated protein is reacted with a coreacting prepolymer of the comonomer that optionally has one or more methylol groups. The molecular weight of the prepolymer is selected based on the desired level of penetration and the total soy amount. The molecular weight of the prepolymer can also affect cure speed. The prepolymer preferably comprises up to about 30 or more repeating units, more preferably from 2, 3, or 4 repeating units up to 5, 6, 7, 8, 9, 10, 11, 12, 13, 14, 15, 16, 17, 18, 19, 20, 21, 22, 23, 24, 25, 26, 27, 28, or 29 repeating units. Particularly preferred prepolymers include phenol formaldehyde, however any prepolymer capable of reacting with the methylolated protein can be employed. Typically, from about 0 to about 60 wt. % of the adhesive is contributed by the prepolymer Preferably, from about 5, 10, 15, 20, 25, or 30 wt. % up to about 35, 40, 45, 50, or 55 wt. % of the adhesive is contributed by the prepolymer.

Preparation of Adhesives by Alternative Method

In certain embodiments, it can be desired to prepare an adhesive by a simplified method involving fewer steps. Such a method is described in copending U.S. application Ser. No. 10/211,944 filed Aug. 1, 2002, and entitled "VEGETABLE PROTEIN ADHESIVE COMPOSITIONS." In the simplified method, the soy protein and one or more co-monomers are polymerized. In order for the polymerization reaction to occur, the soy protein is first subjected to methylolation. If the co-monomers do not already contain methylol groups, they too are subjected to methylolation prior to the polymerization reaction. Preferred co-monomers include any molecule containing methylol groups, or any molecule which may undergo methylolation, for example, via reaction with formaldehyde. Non-limiting examples of suitable methylol-containing molecules include dimethylol urea, trimethylol melamine, tetramethylol ketone and dimethylol phenol. Nonlimiting examples of suitable co-monomers capable of undergoing methylolation via reaction with formaldehyde include urea, melamine, and phenol. In preferred embodiments, the co-monomer is capable of substitution by two, three, four or more methylol groups. Generally, co-monomers having more methylol substituents are more reactive than co-monomers having fewer methylol substituents.

A single co-monomer or mixtures of two or more co-monomers may be used in the adhesives prepared according to the simplified method. A preferred co-monomer mixture contains methylol ketone and methylol phenol. Different co-monomers possess different properties and characteristics. By combining two or more co-monomers having different characteristics, an adhesive having properties that render it especially suitable for a particular application may be obtained.

The first step in the preparation of the adhesives by the simplified method involves methylolation of the denatured protein's polypeptide chain, along with methylolation of any of the co-monomers that do not already incorporate methylol groups. Any suitable reaction may be used to functionalize the protein or co-monomer with hydroxymethyl groups. In preferred embodiments, however, the methylolation reaction proceeds by reacting the protein or co-monomer with formaldehyde in the presence of an acid or base catalyst. The methylolation of the protein and the co-monomer(s) may be conducted simultaneously in the same reaction mixture, or may be conducted separately for each component. Methylolation of proteins and amines such as urea and melamine typically involves substitution of primary and/or secondary aminic hydrogens by hydroxymethyl groups. When the co-monomer is phenol, the methylolation reaction involves replacing the phenol molecule's two ortho hydrogens or an ortho hydrogen and a para hydrogen with hydroxymethyl groups. The reaction yields a mixture of 2,4-dimethylol phenol and 2,6-dimethylol phenol. When the co-monomer is acetone, a methyl hydrogen is replaced by a hydroxymethyl group. Typical methylolation reactions for a polypeptide and selected co-monomers are illustrated below.

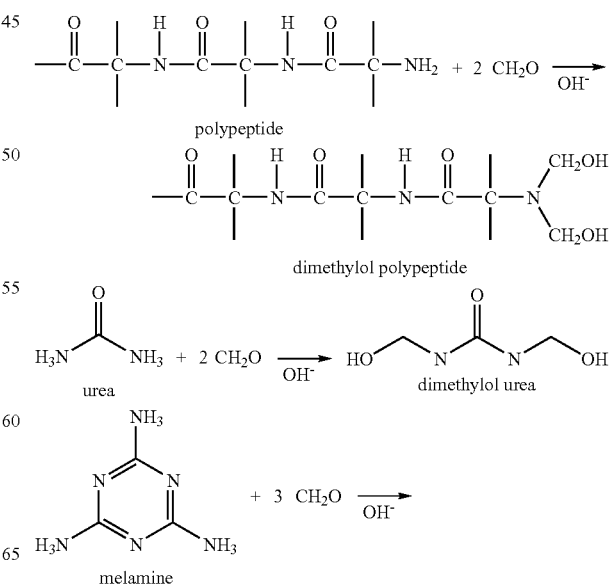

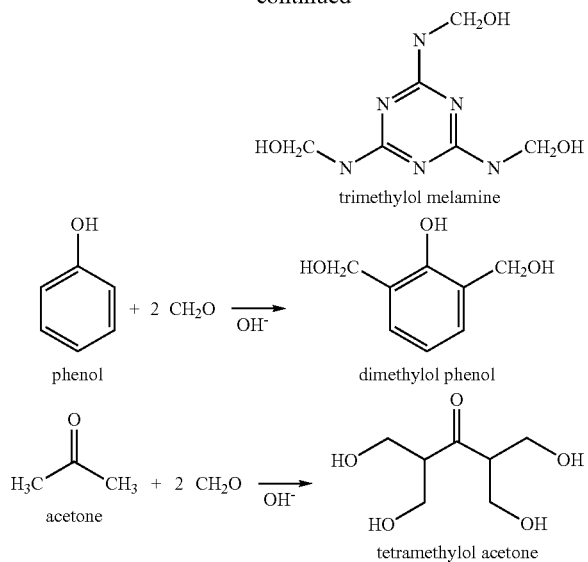

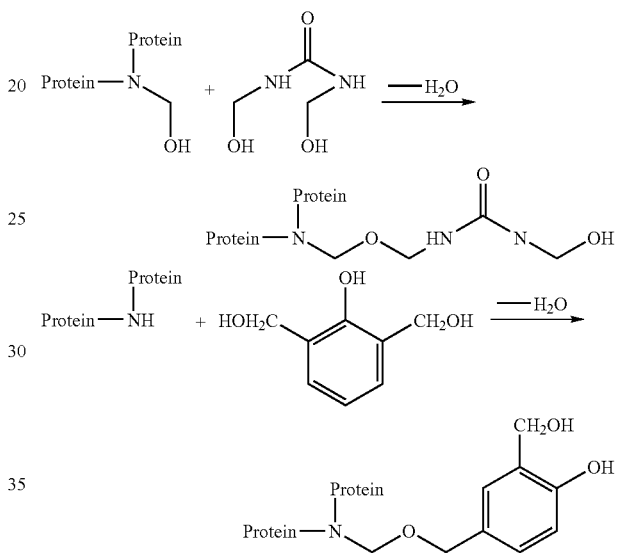

The methylolated co-monomers are commercially available and may be purchased from selected resin manufacturers. Alternatively, co-monomers that are not methylolated or are only partially methylolated may be subjected to a methylolation step as part of the process of preparing the adhesives of preferred embodiments. When methylolating the co-monomer starting material, it is preferred to conduct the methylolation at a pH of about 8.4 to about 10.5, however, in certain embodiments a higher or lower pH may be suitable. The methylolation reaction is preferably conducted at a temperature of about 32° C. to about 75° C. Higher or lower temperatures may also be suitable, depending upon the reactivity of the compound to be methylolated or other factors. Reaction times of from about 20 minutes to two hours are typically sufficient to ensure complete methylolation. However, as will be appreciated by one skilled in the art, the methylolation reaction may proceed more rapidly or more slowly in certain embodiments, resulting in a shorter or longer reaction time.

Methylolation of the polypeptide chains of the soy protein and the non-methylolated or partially-methylolated co-monomer may preferably be conducted at the same time in the same reaction mixture, so as to provide an even simpler process. However, the methylolation of the polypeptide chains of the soy protein may be conducted separately from that of the non-methylolated or partially-methylolated co-monomer in certain embodiments.

After methylolation of the soy protein and, in certain embodiments, the co-monomer, the next step in the preparation of the adhesives by the simplified method involves polymerization (also referred to as resinification or curing) of the protein and co-monomer molecules. One of the reactions in the polymerization process involves the condensation of a methylol group with an amine group to liberate water and form a methylene bridge. Another reaction in this process involves condensation of two methylol groups to yield an unstable ether linkage, which undergoes a reaction to liberate formaldehyde, thereby forming a methylene bridge. This free formaldehyde then reacts with the reactive amine groups of the polypeptide to form additional methylol groups. Methylol groups are also capable of condensing with non-methylolated hydroxyl groups to form unstable ether linkages.

Because each protein molecule typically contains methylol groups and groups that are reactive to methylol groups, significant crosslinking occurs. In preferred embodiments, the reaction is conducted at elevated temperature. Preferred temperatures are typically between 65° C. and 110° C. However, higher or lower temperatures may be preferred in certain embodiments, as will be appreciated by one skilled in the art. Typical condensation reactions between a methylolated protein and either a 2,6-methylolated urea or 2,6-dimethylol phenol are depicted below.

As stated above, the ether linkages formed in certain of the condensation reactions are not stable. At elevated temperatures or under acidic conditions, formaldehyde is spontaneously liberated from the linked molecules to yield a methylene bridge. The released formaldehyde may then participate in further methylolation reactions. The formation of the methylene bridge in a methylolated protein molecule coupled to either methylolated urea or methylolated phenol is depicted below.

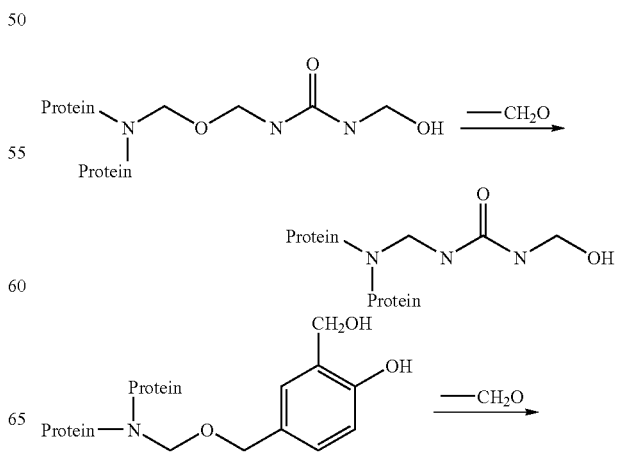

-continued

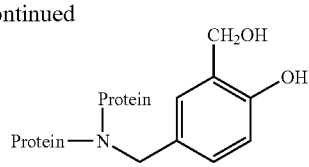

Additives

Many additives can be employed in the preparation of adhesive resins. These additives can lower viscosity, increase cure speed, assist resin flow and distribution, extend shelf life, or lower the cost of the resin. Such additives include, but are not limited to, urea, sodium carbonate, and sodium bicarbonate. Any suitable additive can be employed, provided that the water resistance of the resin is acceptable. A water extraction of the resin of less than about 35% is generally preferred. However, in certain embodiments a higher water extraction can be acceptable. Due to the foaming nature of soy flour upon heating in a water solution, an antifoam agent can be advantageously employed, preferably at a concentration of less than 2% of the total soy flour in the formula. It is generally preferred to employ as little antifoam agent as possible.

Preparation of Adhesive Dispersions

In certain applications, it is desirable to employ the adhesives of preferred embodiments in the form of a dispersion in acidic solution. Any suitable acid can be employed in preparing the solution. Suitable acids include, but are not limited to, sulfuric acid, hydrochloric acid, formic acid, acetic acid, nitric acid, and phosphoric acid. Sulfuric acid is particularly preferred. It is generally preferred that the acid is an aqueous solution. However, any suitable solvent can be employed. Suitable solvents include water, ethanol, methanol, acetonitrile, acetone, pyridine, tetrahydrofuran, and other compatible solvents. In certain embodiments, the acid can be added to the adhesive in undiluted form. For example, undiluted acetic acid or sulfuric acid can be employed.

It is generally preferred to prepare the dispersion by adding the acid to the adhesive at a temperature of from about 0° C. or lower to about 90° C. or higher. Optionally warming the resin to a temperature of 10° C. or higher can facilitate formation of the dispersion. A resin temperature of from about 11, 12, 13, or 14° C. to about 35, 40, 45, or 50, 55, 60, 65, 70, 75, 80, 85, or 90° C. is generally preferred, with a temperature of from about 15, 16, 17, 18, or 19, or 20° C. to about 21, 22, 23, 24, 25, 26, 27, 28, 29 or 30° C. is more preferred. Lower temperatures are generally preferred so as for avoid the formation of excessive particulate matter, which tends to occur at higher temperatures. While it is generally preferred to avoid formation of excessive particulate matter, in certain embodiments the formation of such particulate matter can be acceptable, or even desirable. While it is generally preferred to warm the resin, in certain embodiments it can be desirable to cool the resin to facilitate formation of a dispersion with desired properties.

Sufficient acid is added to the adhesive such that the pH is decreased to near neutral (6.0) or lower, preferably from about 1 or lower to about 6, more preferably from about 1.5, 2, 2.5, 3, or 3.5 to about 5.5, and most preferably from about 4 or 4.5 to about 5. The amount of acid employed depends upon the starting pH and the desired resulting pH. For example, when sulfuric acid is employed with the resins of the preferred embodiments, from about 1 part or less to about 10 parts or more concentrated sulfuric acid is employed per 100 parts adhesive, preferably from about 1, 1.5, 2, 2.5, or 3 parts to about 4, 4.5, 5, 5.5, 6, 6.5, 7, 7.5, 8, 8.5, 9, or 9.5 parts sulfuric acid, and most preferably about 3.5 parts sulfuric acid.

Preparation of acidic dispersions of the adhesives of preferred embodiments can offer several advantages. These advantages include additional copolymerization taking place in the acidic dispersion, greater soy reactivity during copolymerization as demonstrated by lower extractables, greater room temperature stability, lower viscosity, and the ability to employ higher soy levels (up to 75 wt. % or more, for example, on a total soy plus phenol basis). The acidic conditions in the dispersion also permit a greater selection of crosslinking agents to be employed, for example, urea formaldehyde, melamine formaldehyde, novolak phenol formaldehyde, and isocyanates (such as polymeric methylene dipara-phenylene isocyanate).

Use of Adhesives in Composition Boards

The adhesives of preferred embodiments are suitable for use in a variety of applications, including, but not limited to, applications in which conventional resin adhesives are typically used. One particularly preferred application for the adhesives of the preferred embodiments is in the manufacture of composition boards. Oriented strand boards (face and core sections), plywood, particleboard, laminated veneer lumber, and fiberboards are a few examples of possible applications of the resin systems of preferred embodiments. Composition boards can be fabricated from any suitable wood or agricultural material, such as wood, straw (wheat, rice, oat, barley, rye, flax, grass), stalks (corn, sorghum, cotton), sugar cane, bagasse, reeds, bamboo, cotton staple, core (jute, kenaf, hemp), papyrus, bast (jute, kenaf, hemp), cotton linters, esparto grass, leaf (sisal, abaca, henequen), sabai grass, small diameter trees, stand improvement tree species, mixed tree species, plantation residues and thinnings, point source agricultural residues, and recycling products such as paper and paper-based products and waste, and the like. Composition boards prepared using the adhesives of the preferred embodiments possess acceptable physical properties as set forth in industry standards and offer the possibility of lower cost and/or lower volatility products. The resins, such as the soy-based resins, of the preferred embodiments can be applied using conventional equipment such as spinning disk atomizers, spray atomizers, and the like.

Phenol is regulated under the Resource Conservation and Recovery Act, and is listed by the U.S. Environmental Protection Agency (EPA) as a water priority pollutant, a volatile organic compound, and an air toxic listed on the hazardous air pollutant list. Very high concentrations of phenol can cause death if ingested, inhaled or absorbed through skin, and exposure to lower concentrations can result in a variety of harmful health effects. Formaldehyde exposure is also regulated by various governmental agencies, including the U.S. Occupational Safety and Health Administration. If formaldehyde is present in the air at levels at or above 0.1 ppm, acute health effects can occur. Sensitive people can experience symptoms at levels below 0.1 ppm, and persons have been known to develop allergic reactions to formaldehyde through skin contact. Formaldehyde has caused cancer in laboratory animals and may cause cancer in humans.

Because of the adverse health effects associated with exposure to phenol and formaldehyde, adhesives prepared using phenol and formaldehyde as starting materials that have a low level of free phenol and free formaldehyde in the finished adhesive are desirable. Especially desirable are adhesives that comply with EPA regulations for low Volatile Organic Compound (VOC) products. Preferably, the adhesives of preferred embodiments contain less than about 2.5 wt. % free phenol. More preferably, the adhesives contain less than about 2.25, 2, 1.75, 1.5, 1.25, 1, 0.75, 0.5, 0.25, 0.1, 0.05, 0.01, 0.005 or 0.001 wt. % free phenol. Preferably, the adhesives of preferred embodiments contain less than about 1% free formaldehyde. More preferably, the adhesives contain less than about 0.75, 0.5, 0.25, 0.1, 0.075, 0.05, 0.025, 0.01, 0.0075, 0.005, 0.0025, or 0.001 wt. % free formaldehyde.

The physical properties of composition boards are measured according to standards set forth by ASTM International in "Standards and Methods of Evaluating the Properties of Wood-Base Fiber and Particle Panel Materials." Tensile strength perpendicular to the surface, also referred to as internal bond, provides a measure of how well the board is glued together. The value is reported in psi or Pa. The acceptable range for interior applications varies depending upon the grade of composition board. This test is currently not used extensively, but may become more widely used as the composition board industry moves towards greater production of boards for use in structural applications.

Water resistance is evaluated by submerging a sample of board in water at room temperature for 24 hours and by submerging another sample in boiling water for 2 hours. Typically, only the 24 hour test is conducted, unless the panel is used in structural or construction applications. In the water resistance test, the thickness of the board is measured before and after submerging the sample in water. The thickness swell is then measured as the percent increase in thickness relative to the dry thickness.

EXAMPLES

Comparative Example 1

A resin was prepared by combining components in the order as listed in Table 1.

TABLE 1

| Stage I | | | |
|---|---|---|---|
| Sequence | Ingredient | Amount (g) | % to Soy |
| 01 | Water | 268.0 | |
| 02 | NaOH 100% | 8.0 | 8.0 |
| 03 | Poly(ethylene glycol) | 3.0 | 3.0 |
| 04 | Soy Flour | 100.0 | |

| Stage II | | | |
|---|---|---|---|
| Sequence | Ingredient | Amount (g) | Moles to Phenol |
| 05 | Phenol 90% | 47.0 | 1.0 |
| 06 | Formaldehyde 37% | 87.5 | 2.4 |
| | Total | 513.5 | |

In Stage 1, water, NaOH, and poly(ethylene glycol) were combined while mixing. The mixture was heated to 80° C. with modest agitation. Soy flour was added at a rate of 5% of the total soy flour per minute to the mixture with rapid stirring. The mixture was heated to approximately 100° C. over 15 minutes. The maximum temperature reached was 97° C. The temperature was maintained at 96-98° C. for 1 hour.

In Stage 2, the mixture was removed from the heat source and charged with phenol and formaldehyde over 10 minutes, during which the temperature fell to 90° C. The mixture was then subjected to a vacuum distillation for 80 minutes and then cooled to 40° C. in a cold water bath for 10-15 minutes. The resulting solution was filtered through a coarse screen.

Example 2

A resin was prepared by combining components in the order as listed in Table 2 to yield a 70/30 phenol formaldehyde soy resin with 100% low molecular weight phenol formaldehyde.

TABLE 2

| Stage I | | | |
|---|---|---|---|
| Sequence | Ingredient | Amount (g) | % to Soy |
| 01 | Water | 220.0 | |
| 02 | NaOH 100% | 6.8 | 8.0 |
| 03 | Ethylene Glycol | 1.3 | 1.5 |
| 04 | Soy Flour | 85.0 | |

| Stage II | | | |
|---|---|---|---|
| Sequence | Ingredient | Amount (g) | Moles to Phenol |
| 05 | Formaldehyde 37% | 122.0 | 1.04 |
| 06 | Phenol 100% | 136.1 | 1.00 |
| 07 | NaOH 100% | 5.8 | 0.10 |
| 08 | Formaldehyde 37% | 122.0 | 1.04 |
| 09 | NaOH 100% | 2.9 | 0.05 |
| 10 | NaOH 100% | 2.9 | 0.05 |
| | Total | 704.8 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 10 minutes, then the solution was maintained at 75° C. for 20 minutes. Phenol was added to the mixture over 10 minutes, and then NaOH was added. The solution was heated to 75° C., and formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 3

A resin was prepared by combining components in the order as listed in Table 3 to yield a 60/40 phenol formaldehyde soy resin with 100% low molecular weight phenol formaldehyde.

TABLE 3

| Stage I | | | |
|---|---|---|---|
| Sequence | Ingredient | Amount (g) | % to Soy |
| 01 | Water | 270.2 | |
| 02 | NaOH 100% | 10.0 | 8.0 |
| 03 | Ethylene Glycol | 1.9 | 1.5 |
| 04 | Soy Flour | 125.0 | |

TABLE 3-continued

| | Stage II | | |
|---|---|---|---|
| Sequence | Ingredient | Amount (g) | Moles to Phenol |
| 05 | Formaldehyde 37% | 115.4 | 1.04 |
| 06 | Phenol 100% | 128.6 | 1.00 |
| 07 | NaOH 100% | 5.5 | 0.10 |
| 08 | Formaldehyde 37% | 115.4 | 1.04 |
| 09 | NaOH 100% | 2.7 | 0.05 |
| 10 | NaOH 100% | 2.7 | 0.05 |
| | Total | 777.4 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 10 minutes, then the solution was maintained at 75° C. for 20 minutes. Phenol was added to the mixture over 10 minutes, and then NaOH was added. The solution was heated to 75° C., and formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 4

A resin was prepared by combining components in the order as listed in Table 4 to yield a 60/40 phenol formaldehyde soy isolate resin with 100% low molecular weight phenol formaldehyde.

TABLE 4

| | Stage I | | |
|---|---|---|---|
| Sequence | Ingredient | Amount (g) | % to Soy |
| 01 | Water | 292.9 | |
| 02 | NaOH 100% | 20.0 | 16.0 |
| 03 | Ethylene Glycol | 1.9 | 1.5 |
| 04 | Soy Isolates | 125.0 | |

| | Stage II | | |
|---|---|---|---|
| Sequence | Ingredient | Amount (g) | Moles to Phenol |
| 05 | Formaldehyde 37% | 124.6 | 1.04 |
| 06 | Phenol 100% | 139.0 | 1.00 |
| 07 | NaOH 100% | 5.9 | 0.10 |
| 08 | Formaldehyde 37% | 125.6 | 1.04 |
| 09 | NaOH 100% | 3.9 | 0.05 |
| 10 | NaOH 100% | 2.9 | 0.05 |
| | Total | 839.8 | |

In Stage 1, water was combined with NaOH and ethylene glycol with mixing. The mixture was heated to 70° C. with modest agitation. Soy isolates were added to the mixture at 5% of the total soy isolates per minute with rapid stirring. The mixture was heated to 90° C. over 15 minutes, and maintained at a temperature of 88-92° C. for 1 hour.

In Stage 2, the mixture was removed from the heat source and charged with formaldehyde over 10 minutes, then the solution was maintained at 75° C. for 20 minutes. Phenol was added to the mixture over 10 minutes, and then NaOH was added. The solution was heated to 75° C., and formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 5

A resin was prepared by combining components in the order as listed in Table 5 to yield a 50/50 phenol formaldehyde soy resin with 100% low molecular weight phenol formaldehyde.

TABLE 5

| | Stage I | | |
|---|---|---|---|
| Sequence | Ingredient | Amount (g) | % to Soy |
| 01 | Water | 571.5 | |
| 02 | NaOH 100% | 24.0 | 8.0 |
| 03 | Ethylene Glycol | 4.5 | 1.5 |
| 04 | Soy Flour | 300 | |

| | Stage II | | |
|---|---|---|---|
| Sequence | Ingredient | Amount (g) | Moles to Phenol |
| 05 | Formaldehyde 37% | 184.6 | 1.04 |
| 06 | Phenol 100% | 205.8 | 1.00 |
| 07 | NaOH 100% | 8.8 | 0.10 |
| 08 | Formaldehyde 37% | 184.6 | 1.04 |
| 09 | NaOH 100% | 4.4 | 0.05 |
| 10 | NaOH 100% | 4.4 | 0.05 |
| | Total | 1492.6 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 10 minutes, then the solution was maintained at 75° C. for 20 minutes. Phenol was added to the mixture over 10 minutes, and then NaOH was added. The solution was heated to 75° C., and formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 6

A resin was prepared by combining components in the order as listed in Table 6 to yield a 66/34 phenol formaldehyde soy resin with 100% low molecular weight phenol formaldehyde.

TABLE 6

Stage I

| Sequence | Ingredient | Amount (g) | % to Soy |
|---|---|---|---|
| 01 | Water | 285.9 | |
| 02 | NaOH 100% | 12.0 | 8.0 |
| 03 | Ethylene Glycol | 2.25 | 1.5 |
| 04 | Soy Flour | 150 | |

Stage II

| Sequence | Ingredient | Amount (g) | Moles to Phenol |
|---|---|---|---|
| 05 | Formaldehyde 37% | 48.9 | 1.29 |
| 06 | Phenol 100% | 44.1 | 1.00 |
| 07 | NaOH 100% | 3.75 | 0.20 |
| 08 | Formaldehyde 37% | 80.4 | 2.11 |
| 09 | NaOH 100% | 1.9 | 0.10 |
| 10 | NaOH 100% | 1.9 | 0.10 |
| | Total | 631.1 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 5 minutes, while maintaining at a temperature of 90° C. for an additional 55 minutes after the addition was complete. Phenol was added to the mixture over 10 minutes and the solution was cooled to 75° C., then NaOH was added. Formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 7

A resin was prepared by combining components in the order as listed in Table 7 to yield a 30/70 phenol formaldehyde soy resin with 100% low molecular weight phenol formaldehyde.

TABLE 7

Stage I

| Sequence | Ingredient | Amount (g) | % to Soy |
|---|---|---|---|
| 01 | Water | 760.1 | |
| 02 | NaOH 100% | 32.0 | 8.0 |
| 03 | Ethylene Glycol | 6.0 | 1.5 |
| 04 | Soy Flour | 400 | |

Stage II

| Sequence | Ingredient | Amount (g) | Moles to Phenol |
|---|---|---|---|
| 05 | Formaldehyde 37% | 105.5 | 1.04 |
| 06 | Phenol 100% | 117.6 | 1.00 |
| 07 | NaOH 100% | 5.0 | 0.10 |
| 08 | Formaldehyde 37% | 105.5 | 1.04 |
| 09 | NaOH 100% | 2.5 | 0.05 |
| 10 | NaOH 100% | 2.5 | 0.05 |
| | Total | 1536.7 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 10 minutes, then the solution was maintained at 75° C. for 20 minutes. Phenol was added to the mixture over 10 minutes, and then NaOH was added. The solution was heated to 75° C., and formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 8

A reactive phenol formaldehyde was prepared by combining components in the order as listed in Table 8. The reactive resin was later blended with a soy phenol formaldehyde resin.

TABLE 8

| Sequence | Ingredient | Amount (g) | Moles to Phenol |
|---|---|---|---|
| 01 | Water | 94.5 | |
| 02 | NaOH 100% | 23.3 | 0.20 |
| 03 | Phenol 100% | 274.4 | 1.00 |
| 04 | Formaldehyde 37% | 492.2 | 2.08 |
| | Total | 884.4 | |

Water was combined with NaOH and phenol and the mixture was heated to 70° C. Formaldehyde was then added dropwise over 60 minutes while maintaining the mixture at a temperature of 68-72° C. The resulting clear homogeneous solution was held at 70° C. for 1 hour after the formaldehyde addition was completed. The temperature was then raised to 85° C. and held at that temperature until a Gardner viscosity of "T" was obtained (a total of 140 minutes). The mixture was then cooled to 40° C. in a cold water bath over 10-15 minutes. The solution was filtered through a coarse screen.

Example 9

A 70/30 phenol formaldehyde soy resin with 18% low molecular weight phenol formaldehyde was prepared by combining 114.6 g of the resin of Example 8 with 100 g of the resin of Example 7 to yield 214.6 g of a homogenous resin mixture.

Example 10

A 70/30 phenol formaldehyde soy resin with 43% low molecular weight phenol formaldehyde was prepared by combining 58.8 g of the resin of Example 8 with 100 g of the resin of Example 5 to yield 158.8 g of a homogenous resin mixture.

Example 11

A 60/40 phenol formaldehyde soy resin with 35% low molecular weight phenol formaldehyde was prepared by combining 103.2 g of the resin of Example 8 with 196.8 g of the resin of Example 6 to yield 300.0 g of a homogenous resin mixture.

Example 12

A 60/40 phenol formaldehyde soy resin with 35% low molecular weight phenol formaldehyde was prepared by combining 137.6 g of the resin of Example 8 with 262.5 g of the resin of Example 6 and 14.0 g of 50% NaOH to yield 414.1 g of a homogenous resin mixture. The additional NaOH increased the solids and reduced the viscosity of the resulting mixture.

Example 13

A resin was prepared by combining components in the order as listed in Table 9 to yield a 40/60 phenol formaldehyde soy resin with 25% low molecular weight phenol formaldehyde in a one-pot process.

TABLE 9

| Sequence | Ingredient | Amount (g) | % to Soy |
|---|---|---|---|
| | Stage I | | |
| 01 | Water | 269.2 | |
| 02 | NaOH 100% | 10.0 | 8.0 |
| 03 | Ethylene Glycol | 1.9 | 1.5 |
| 04 | Soy Flour | 125.0 | |

| Sequence | Ingredient | Amount (g) | Moles to Phenol |
|---|---|---|---|
| | Stage II | | |
| 05 | Formaldehyde 37% | 65.2 | 0.62 |
| 06 | Phenol 100% | 91.4 | 0.75 |
| 07 | NaOH 100% | 6.7 | 0.13 |
| 08 | Formaldehyde 37% | 130.4 | 1.24 |
| 09 | NaOH 100% | 3.4 | 0.07 |
| 10 | Phenol 100% | 30.5 | 0.25 |
| 11 | Formaldehyde 37% | 65.2 | 0.62 |
| 12 | NaOH 100% | 3.4 | 0.07 |
| | Total | 802.3 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 5 minutes, then the solution was maintained at 75° C. for 60 minutes. Phenol was added to the mixture over 5 minutes, and then NaOH was added. The solution was heated to 75° C. and maintained at that temperature for 30 minutes. Formaldehyde was added over 10 minutes while maintaining the temperature at 75° C. NaOH was then added, and the mixture was heated to 90° C. over 10 minutes. The mixture was cooled to 75° C. over 10 minutes, and then phenol was added over 5 minutes while maintaining the temperature at 75° C. Formaldehyde was then added over 5 minutes, after which NaOH was added, all while maintaining the temperature at 75° C. After maintaining the mixture at 75° C. for an additional 90 minutes, it was cooled to 40° C. in a cold water bath over 10-15 minutes. The solution was filtered through a coarse screen.

Example 14

A resin was prepared by combining 655.8 g of the resin of Example 13 with 92.6 g water and 24.1 g NaOH 50%. The resulting resin exhibited a higher pH and a lower solids content and viscosity than the resin of Example 13.

Example 15

A 50/50 phenol formaldehyde soy resin with 43% low molecular weight phenol formaldehyde was prepared by combining 75.6 g of the resin of Example 8 with 220.0 g of the resin of Example 7 to yield 295.6 g of a homogenous resin mixture.

Example 16

A 50/50 phenol formaldehyde soy resin with 43% low molecular weight phenol formaldehyde modified with urea was prepared. 4.0 g of urea was dissolved into 90.2 g of the resin of Example 8. The resulting mixture was combined with 300.0 g of the resin of Example 7 to yield 394.2 g of a homogenous solution. The total urea to high molecular weight phenol formaldehyde was 10% on a solids basis.

The properties of the resins of Examples 1-16 are summarized in Table 10. The % Soy was calculated as follows:

$$\frac{\text{Dry Soy (g)}}{\text{Dry Soy (g)} + \text{Cured Phenol Formaldehyde (g)}} \times 100 = \% \text{ Soy}$$

Viscosity was measured using a Brookfield Viscometer with LVT#3 spindle at 60 and 30 RPMs. Solids were determined using a 150° C./1 hour oven solids pan method. Gel times were measured using a Sunshine gel meter at 98-100° C. Extract was measured as the amount of resin extracted from a cured oven solids sample after 24 hour Soxhlet water extraction. Free phenol was measured using High Pressure Liquid Chromatography (HPLC) with 3-hydroxymethyl phenol as an internal standard. Free formaldehyde was determined using a hydroxylamine hydrochloride back titration method.

TABLE 10

Properties of Soy-Based Resins

| Example | % Soy | pH | Solids (%) | Viscosity (cps) | Gel Time (min) | Extract (%) | Free Phenol (%) | Free CH$_2$O (%) |
|---|---|---|---|---|---|---|---|---|
| Conventional Phenol Formaldehyde | 0 | 11.00 | 53.8 | 184/184 | 24.6 | 29.1 | 0.23 | <0.1 |
| 8 (Phenol Formaldehyde— No Protein) | 0 | 10.30 | 44.9 | 760/760 | 23.0 | 2.8 | 0.52 | 0.70 |
| 1 (Comparative) | 63 | 9.68 | 43.7 | 5100/6500 | — | 20.0 | — | — |
| 2 | 30 | 9.92 | 39 | 96/105 | 60.3 | 10.3 | — | — |

TABLE 10-continued

Properties of Soy-Based Resins

| Example | % Soy | pH | Solids (%) | Viscosity (cps) | Gel Time (min) | Extract (%) | Free Phenol (%) | Free CH$_2$O (%) |
|---|---|---|---|---|---|---|---|---|
| 3 | 40 | 9.90 | 38.9 | 218/245 | — | 14.3 | 1.43 | — |
| 4 | 40 | 9.96 | 38.4 | 70/72 | 55.2 | 12.9 | 2.33 | 0.22 |
| 5 | 50 | 10.00 | 39.6 | 714/848 | 54.3 | 13.0 | — | — |
| 6 | 66 | 10.32 | 36.3 | 1080/1372 | 58.9 | 31.4 | 0.17 | 0.65 |
| 7 | 70 | 10.19 | 36.1 | 3880/4920 | 83.0 | 34.0 | 2.40 | 0.15 |
| 9 | 30 | 10.11 | 36.3 | 508/544 | 28.0 | 11.0 | — | — |
| 10 | 30 | 10.05 | 41.2 | 638/676 | 35.5 | — | — | — |
| 11 | 40 | 10.18 | 39.1 | 1150/1256 | — | 16.6 | — | — |
| 12 | 40 | 11.10 | 39.2 | 786/876 | 48.0 | 22.4 | — | — |
| 13 | 40 | 10.12 | — | >5000 | — | — | — | — |
| 14 | 40 | 11.36 | 34.4 | 1190/1304 | 36.9 | 23.0 | 0.32 | — |
| 15 | 50 | 10.19 | 38.5 | 1852/2116 | 36.3 | 11.0 | — | — |
| 16 | 50 | 10.29 | 38.3 | 3230/3780 | 42.3 | 20.5 | — | — |

Examples 17-34

Randomly oriented strand boards were prepared using the resins of Examples 1-16. The panels were prepared to the specifications of Table 11, unless otherwise indicated. In a typical oriented strandboard method, sandwich board was prepared with two face layers and one center core layer. The center core layer represented 45% of the total dry mass of the finished panel. The two outer face layers were of identical size and together comprised the remaining 55% of the total mass. Unless otherwise specified, the core section of all panels contained only commercial phenol formaldehyde resin and commercial wax emulsion.

Two panels were prepared for each resin system under each press time. The panels were measured for density, dry internal bond (ASTM D-1037-99, four samples per panel), 24 hour room temperature thickness swell (ASTM D-1037-99, two samples per panel), 2 hour boil thickness swell (sample measurement and testing per ASTM D-1037-99, two samples per panel), and wet internal bond (testing per ASTM D-1037-99, two samples per panel). The lower the thickness swell and the higher the internal bond strength (IB), the better the performance of the adhesive. For comparison, all board sets contained panels made from a commercial phenol formaldehyde resin that were prepared using the same pressing cycle and furnish as the soy based resins.

TABLE 11

| | |
|---|---|
| Formed Mat Size: | 16" × 16" |
| Trimmed Board Size | 14" × 14" |
| Furnish Moisture % | 5.6 |
| Furnish Type | Mixed hard/soft |
| Face/Core Ratio | 55/45 |
| Final Thickness | 7/16" |
| Final Target Density (lb/ft$^3$) | 42.0 |
| Face Resin % | 3.26 |
| Face Wax (emulsion) % | 1.31 |
| Core Resin % | 3.89 (commercial phenol formaldehyde control unless specified) |
| Core Wax (emulsion) % | 1.39 |
| Press Size | 20" × 20" |
| Press Temp (° C.) | 200 |
| Press Soak Times (sec) | 120-330 seconds as specified |
| Press Close Time (sec) | 40-50 |
| Total Face Matt Moisture (%) | 11.0 |

The strand board panels of Examples 17-20 included woods comprising 62% black tupelo, 34% soft maple, 3% yellow pine, and 1% other species. The properties of the strand board panels are summarized in Table 12.

TABLE 12

Properties of Strand Board Panels

| | | | | | Thickness Swell % | | Internal Bond (PSI) | |
|---|---|---|---|---|---|---|---|---|
| | | | | | 2 hr Boil | 24 hr Room | | |
| Ex. | Face Resin | % Soy | Press Soak (sec) | Density (lb/ft$^3$) | at 100° C. (one SD) | Temperature (one SD) | Dry (one SD) | Wet (one SD) |
| 17 | Conventional Phenol Formaldehyde | 0 | 210 | 41.7 | 76.7 | 17.0 | 99.8 | 2.5 |
| | | | | | (2.8) | (1.9) | (24.1) | (2.2) |
| | | | 330 | 42.3 | 62.8 | 15.2 | 86.3 | 8.1 |
| | | | | | (4.8) | (1.5) | (25.6) | (1.5) |
| 18 | Ex. 3 | 40 | 210 | 41.6 | 84.4 | 20.8 | 72.4 | 0.6 |
| | | | | | (13.2) | (1.9) | (13.7) | (0.5) |
| | | | 330 | 41.9 | 65.1 | 14.5 | 89.3 | 8.7 |
| | | | | | (3.6) | (1.7) | (16.5) | (5.8) |
| 19 | Ex. 4 | 40 | 210 | 40.6 | 88.7 | 38.3 | 60.7 | 0.5 |
| | | | | | (6.9) | (5.8) | (16.6) | (0.2) |
| | | | 330 | 40.6 | 65.9 | 15.3 | 97.8 | 2.1 |
| | | | | | (9.2) | (2.2) | (19.1) | (1.3) |

TABLE 12-continued

Properties of Strand Board Panels

| | | | | | Thickness Swell % | | Internal Bond (PSI) | |
| | | | | | 2 hr Boil at 100° C. | 24 hr Room Temperature | Dry | Wet |
| Ex. | Face Resin | % Soy | Press Soak (sec) | Density (lb/ft³) | (one SD) | (one SD) | (one SD) | (one SD) |
|---|---|---|---|---|---|---|---|---|
| 20 | Ex. 3* | 40 | 210 | 39.4 | 98.6 (15.0) | 64.7 (5.9) | 7.4 (1.4) | 0.3 |
| | | | 330 | 40.8 | 90.4 (8.6) | 16.2 (7.9) | 53.8 (8.4) | 0.8 (0.4) |

*Resin was used in both face and core sections
SD = Standard Deviation

The results of Table 12 demonstrate that a composite panel prepared from a soy flour based resin (for example, Example 18 prepared from a resin containing 40% soy flour) exhibited comparable performance to that of a panel prepared from a conventional phenol formaldehyde resin (Example 17). The soy flour resin was also comparable to a similarly prepared soy isolate-based resin (Example 19). Although soy based resins are particularly well suited to use as a face resin, the data of Example 20 demonstrate the suitability of a 40% soy flour based resin for use in both the face and core sections of a composite panel when extended press times are employed.

The strand board panels of Examples 21-29 included woods comprising 26% black tupelo, 18% soft maple, 52% yellow pine and 4% other species. The properties of the strand board panels are summarized in Table 13.

TABLE 13

| | | | | | Thickness Swell % | | Internal Bond (PSI) | |
| | | | | | 2 hr Boil at 100° C. | 24 hr Room Temperature | Dry | Wet |
| Ex. | Face Resin | % Soy | Press Soak (sec) | Density (lb/ft³) | (one SD) | (one SD) | (one SD) | (one SD) |
|---|---|---|---|---|---|---|---|---|
| 21 | Conventional Phenol Formaldehyde | 0 | 210 | 41.9 | 54.2 (2.5) | 41.9 (1.9) | 87.0 (14.4) | 15.4 (1.4) |
| | | | 330 | 41.6 | 48.3 (1.8) | 37.3 (1.2) | 87.8 (15.3) | 14.4 (5.5) |
| 22 | Ex. 8 | 0 | 210 | 42.2 | 60.2 (1.8) | 42.7 (3.3) | 92.3 (17.8) | 14.3 (2.0) |
| | | | 330 | 41.1 | 54.2 (3.0) | 39.4 (1.4) | 103.0 (9.5) | 15.4 (2.4) |
| 23 | Ex. 5 | 50 | 210 | 41.6 | 83.1 (4.2) | 52.9 (4.8) | 70.6 (15.5) | 0.3 |
| | | | 330 | 41.0 | 61.8 (2.1) | 45.1 (2.3) | 82.5 (15.8) | 4.1 (2.2) |
| 24 | Ex. 15 | 50 | 210 | 40.9 | 68.3 (4.6) | 44.2 (2.3) | 78.1 (3.9) | 2.4 (2.0) |
| | | | 330 | 40.3 | 57.2 (6.1) | 40.2 (2.3) | 90.3 (13.8) | 7.6 (2.3) |
| 25 | Ex. 2 | 30 | 210 | 42.0 | 58.5 (5.1) | 41.8 (1.2) | 88.0 (25.3) | 10.9 (3.6) |
| | | | 330 | 41.2 | 50.8 (1.6) | 37.8 (1.3) | 95.7 (19.6) | 17.0 (3.0) |
| 26 | Ex. 10 | 30 | 210 | 40.0 | 55.4 (1.3) | 37.1 (3.0) | 70.5 (27.3) | 8.1 (1.3) |
| | | | 330 | 40.5 | 47.1 (1.3) | 34.7 (2.4) | 101.7 (11.9) | 15.0 (3.0) |
| 27 | Ex. 9 | 30 | 210 | 40.7 | 52.4 (7.0) | 39.3 (3.8) | 83.4 (19.5) | 16.7 (6.5) |
| | | | 330 | 40.9 | 47.8 (4.4) | 35.2 (1.0) | 99.3 (9.2) | 23.6 (3.4) |
| 28 | Ex. 7 | 70 | 210 | 40.0 | 75.3 (5.5) | 56.1 (6.2) | 40.6 (8.8) | 0.3 |
| | | | 330 | 42.0 | 81.2 (6.0) | 56.9 (2.0) | 77.5 (13.7) | 0.3 |
| 29 | Ex. 16 | 50 | 210 | 41.9 | 70.9 (5.2) | 47.8 (2.7) | 78.8 (8.2) | 2.4 (2.3) |
| | | | 330 | 40.7 | 55.0 (6.4) | 39.4 (3.4) | 92.4 (10.1) | 9.8 (1.6) |

SD = Standard Deviation

The molecular weight of the crosslinking copolymer and the amount of total soy in the soy-based resin were both factors evaluated in the experiments reported in Table 13. The addition of higher molecular weight phenol formaldehyde to a partially copolymerized soy and low molecular weight phenol formaldehyde resin yielded superior resins with faster cure speeds. As demonstrated by the data of Examples 23 and 24, the higher soy containing resins exhibited improved performance. The high molecular weight phenol formaldehyde resin used was prepared according to Example 8, and when used in the face section of the composite panels performed comparably to the commercial phenol formaldehyde control. (Example 21 compared to Example 22). Example 29 demonstrated that urea can be added to a high soy containing resin with no adverse performance effects.

The strand board panels of Examples 30-34 included woods comprising 4.2% black tupelo, 2.0% soft maple, 92.8% yellow pine, and 1% other species. The properties of the strand board panels are summarized in Table 14.

Example 35

Soy-based dispersion resins were prepared according to the following procedure. A soy-based adhesive prepared according to the preferred embodiments was heated to a temperature of 20-30° C. Concentrated sulfuric acid was added dropwise to the rapidly stirring adhesive solution until the target pH was obtained. The resulting dispersion was then ready for use as an adhesive. Table 15 provides data on the properties of several adhesive dispersions. The dispersions were prepared from an adhesive prepared according to Example 36.

Example 36

A resin was prepared by combining components in the order as listed in Table 15 to yield a 66/34 phenol formaldehyde soy resin with 100% low molecular weight phenol formaldehyde.

TABLE 14

| Ex. | Face Resin | % Soy | Press Soak (sec) | Density ($lb/ft^3$) | Thickness Swell % 2 hr Boil at 100° C. (one SD) | Thickness Swell % 24 hr Room Temperature (one SD) | Internal Bond (PSI) Dry (one SD) | Internal Bond (PSI) Wet (one SD) |
|---|---|---|---|---|---|---|---|---|
| 30 | Conventional Phenol Formaldehyde | 0 | 150 | 42.1 | 68.1 | 42.5 | 53.3 | 3.6 |
|  |  |  |  |  | (7.5) | (4.2) | (12.7) | (1.7) |
|  |  |  | 210 | 42.0 | 63.5 | 41.0 | 80.4 | 9.2 |
|  |  |  |  |  | (6.0) | (3.3) | (7.7) | (4.7) |
| 31 | Ex. 1 | 63 | 150 | 43.8 | 106.0 | 74.8 | 51.0 | <1 |
|  |  |  |  |  | (16.0) | (5.7) | (17.2) | — |
|  |  |  | 210 | 42.9 | 106.1 | 64.9 | 44.9 | <1 |
|  |  |  |  |  | (14.8) | (5.8) | (11.3) | — |
| 32 | Ex. 11 | 40 | 150 | 41.7 | 68.9 | 44.3 | 62.0 | 5.4 |
|  |  |  |  |  | (6.6) | (4.9) | (13.6) | (4.5) |
|  |  |  | 210 | 43.0 | 71.5 | 39.4 | 76.1 | 6.8 |
|  |  |  |  |  | (3.3) | (4.1) | (12.8) | (1.3) |
| 33 | Ex. 12 | 40 | 150 | 40.7 | 73.7 | 42.1 | 59.7 | 2.1 |
|  |  |  |  |  | (7.4) | (2.0) | (15.9) | (1.9) |
|  |  |  | 210 | 42.4 | 62.4 | 40.3 | 75.8 | 9.2 |
|  |  |  |  |  | (5.0) | (2.8) | (12.5) | (5.4) |
| 34 | Ex. 14 | 40 | 150 | 42.3 | 68.5 | 43.2 | 80.2 | 7.4 |
|  |  |  |  |  | (5.3) | (3.8) | (8.4) | (2.9) |
|  |  |  | 210 | 43.0 | 64.6 | 43.4 | 94.7 | 9.3 |
|  |  |  |  |  | (6.0) | (2.5) | (17.6) | (1.2) |

SD = Standard Deviation

Example 31 is a comparative example of a soy flour based resin. Examples 32 and 33 demonstrate that a decrease in the viscosity of the resin by the addition of more alkali can be achieved and still yield a composite panel comparable to the control. As demonstrated in Table 13, the addition of higher molecular weight phenol formaldehyde to the soy flour and low molecular phenol formaldehyde resin weight system resulted in improved performance. The data of Table 14 demonstrated that addition by either blending (Examples 32 or 33) or preparation in situ in a one-pot process (Example 34) resulted in similar performance.

TABLE 15

| Stage I | | | |
|---|---|---|---|
| Sequence | Ingredient | Amount (g) | % to Soy |
| 01 | Water | 285.9 |  |
| 02 | NaOH 100% | 12.0 | 8.0 |
| 03 | Ethylene Glycol | 2.25 | 1.5 |
| 04 | Soy Flour | 150 |  |

TABLE 15-continued

| | Stage II | | |
|---|---|---|---|
| Sequence | Ingredient | Amount (g) | Moles to Phenol |
| 05 | Formaldehyde 37% | 48.9 | 1.29 |
| 06 | Phenol 100% | 44.1 | 1.00 |
| 07 | NaOH 100% | 3.75 | 0.20 |
| 08 | Formaldehyde 37% | 80.4 | 2.11 |
| 09 | NaOH 100% | 1.9 | 0.10 |
| 10 | NaOH 100% | 1.9 | 0.10 |
| | Total | 631.1 | |

In Stage 1, water was combined with NaOH and ethylene glycol with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde over 5 minutes, while maintaining 90° C. for an additional 55 minutes after the addition was complete. Phenol was added to the mixture over 10 minutes and the solution was cooled to 75° C., then NaOH was added. Formaldehyde was added over 10 minutes while maintaining the temperature at 75° C. NaOH was then added, and the mixture held at 75° C. for 5 minutes, then the remaining NaOH was added. After maintaining the mixture at 75° C. for an additional 90 minutes, it was cooled to 40° C. in a cold water bath over 10-15 minutes. The solution was filtered through a coarse screen.

Example 37

A reactive phenol formaldehyde was prepared by combining components in the order as listed in Table 16.

TABLE 16

| Sequence | Ingredient | Amount (g) | Moles to Phenol |
|---|---|---|---|
| 01 | Water | 94.5 | |
| 02 | NaOH 100% | 23.3 | 0.20 |
| 03 | Phenol 100% | 274.4 | 1.00 |
| 04 | Formaldehyde 37% | 492.2 | 2.08 |
| | Total | 884.4 | |

Water was combined with NaOH and phenol and the mixture was heated to 70° C. Formaldehyde was then added dropwise over 60 minutes while maintaining the mixture at a temperature of 68-72° C. The resulting clear homogeneous solution was held at 70° C. for 1 hour after the formaldehyde addition was completed. The temperature was then raised to 85° C. and held at that temperature until a Gardner viscosity of "T" was obtained (a total of 140 minutes). The mixture was then cooled to 40° C. in a cold water bath over 10-15 minutes. The solution was filtered through a coarse screen.

Example 38

A dispersion resin was prepared by combining components in the order as listed in Table 17 to yield a 34/66 phenol formaldehyde soy resin.

TABLE 17

| Sequence | Ingredient | Amount (g) |
|---|---|---|
| 01 | Resin from Example 36 | 400.0 |
| 02 | Sulfuric Acid | 14.0 |
| | Total | 414.0 |

To a 1 liter round bottom flask equipped with an overhead stirrer, thermometer, and condenser, the resin from Example 36 was charged and the agitation was then initiated. The resin solution was allowed to stir for 5 minutes while the temperature was adjusted to 25° C. with a water bath. The condenser was then removed from the flask and the sulfuric acid was added dropwise to the rapidly stirring mixture over a period of 5 minutes. The exotherm was controlled with a water bath and the max temperature was 29° C. The dispersion was allowed to mix for 10 minutes at a temperature of 25° C. The dispersion was filtered through a coarse screen.

Example 39

A dispersion resin was prepared by combining components in the order as listed in Table 18 to yield a 34/66 phenol formaldehyde soy resin. The molecular weight of the resin was increased by further heating after the inversion process.

TABLE 18

| Sequence | Ingredient | Amount (g) |
|---|---|---|
| 01 | Resin from Example 36 | 400.0 |
| 02 | Sulfuric Acid | 14.0 |
| | Total | 414.0 |

To a 1 liter round bottom flask equipped with an overhead stirrer, thermometer, and condenser, the resin from Example 36 was charged and the agitation was then initiated. The temperature of the resin solution was then raised to 85° C. over 30 minutes and held for 1 hr at 85° C. and then cooled to 25° C. with an ice water bath. The condenser was then removed from the flask and the sulfuric acid was added dropwise to the rapidly stirring mixture over a period of 10 minutes. The dispersion was allowed to mix for 20 minutes at a temperature of 25° C. The dispersion was filtered through a coarse screen.

Example 40

A dispersion resin was prepared by combining components in the order as listed in Table 19 to yield a 50/50 phenol formaldehyde soy resin.

TABLE 19

| Sequence | Ingredient | Amount (g) |
|---|---|---|
| 01 | Resin from Example 36 | 814.8 |
| 02 | Resin from Example 37 | 191.5 |
| 03 | Sulfuric Acid | 35.2 |
| | Total | 1041.5 |

To a 2 liter round bottom flask equipped with an overhead stirrer, thermometer, and condenser, the resin from Example 36 was charged and the agitation was then started. The resin from Example 37 was then added and the mixture was allowed to stir for 5 minutes while the temperature was adjusted to 23° C. with a water bath. The condenser was then removed from the flask and the sulfuric acid was added dropwise to the rapidly stirring mixture over a period of 10 minutes. The dispersion was allowed to mix for 15 minutes at a temperature of 25° C. The dispersion was filtered through a coarse screen.

Example 41

A dispersion resin was prepared by combining components in the order as listed in Table 20 to yield a 50/50 phenol formaldehyde soy resin similar to Example 40, but with a lower pH.

TABLE 20

| Sequence | Ingredient | Amount (g) |
|---|---|---|
| 01 | Resin from Example 40 | 455.1 |
| 02 | Sulfuric Acid | 6.8 |
| | Total | 461.9 |

To a round bottom flask equipped with an overhead stirrer, thermometer, and condenser, the resin from Example 40 was charged and the agitation was then started. The mixture was allowed to stir for 5 minutes while the temperature was adjusted to 25° C. with a water bath. The condenser was then removed from the flask and the sulfuric acid was added dropwise to the rapidly stirring mixture over a period of 5 minutes. The dispersion was allowed to mix for 15 minutes at a temperature of 25° C. The dispersion was filtered through a coarse screen.

Example 42

Soy dispersions were combined with isocyanate resins to improve their durability. The lower pH of the dispersion, compared to typical alkaline phenol formaldehyde resins, renders it compatible with isocyanate resins. In this example, a dispersion resin, similar to that in Example 38 was combined with commercial polymerized methylene diisocyanate (pMDI). A dispersion resin was prepared by combining components in the order as listed in Table 21 to yield a 60/31/9 Soy/phenol formaldehyde/pMDI soy resin.

TABLE 21

| Sequence | Ingredient | Amount (g) |
|---|---|---|
| 01 | Resin from Example 38 | 500.0 |
| 02 | PMDI | 17.3 |
| | Total | 517.3 |

To a round bottom flask equipped with an overhead stirrer, thermometer, and condenser, the resin from Example 38 was charged and the agitation was then started. The mixture was allowed to stir for 5 minutes while the temperature was adjusted to 25° C. with a water bath. The condenser was then removed from the flask and the pMDI was added dropwise to the rapidly stirring mixture over a period of 5 minutes. The dispersion was allowed to mix for 15 minutes at a temperature of 25° C. The dispersion was filtered through a coarse screen.

Example 43

Soy dispersions were prepared with urea formaldehyde (UF) resins prepared in situ. The lower pH of the dispersion, compared to typical alkaline phenol formaldehyde resins, renders it reactive with UF resins. In this example, an alkaline soy-PF resin was prepared first, followed by the addition of urea, inversion and additional formaldehyde. The dispersion resin was prepared by combining components in the order as listed in Table 22 to yield a 50/25/25 Soy/phenol formaldehyde/urea formaldehyde resin with a total formaldehyde/phenol plus urea of 1.95 moles/moles.

TABLE 22

| Stage I | | | |
|---|---|---|---|
| Sequence | Ingredient | Amount (g) | % to Soy |
| 01 | Water | 522.1 | |
| 02 | NaOH 100% | 25.0 | 10.0 |
| 03 | Ethylene Glycol | 3.75 | 1.5 |
| 04 | Dow Antifoam 1500 | 0.25 | 0.1 |
| 05 | Soy Flour | 250.0 | |

| Stage II | | | |
|---|---|---|---|
| Sequence | Ingredient | Amount (g) | Moles to Phenol |
| 06 | Formaldehyde 37% | 85.1 | 1.26 |
| 07 | Phenol 100% | 78.2 | 1.00 |
| 08 | NaOH 100% | 10.0 | 0.40 |
| 09 | Formaldehyde 37% | 252.0 | 3.74 |
| 10 | NaOH 100% | 5.0 | 0.20 |
| 11 | NaOH 100% | 5.0 | 0.20 |
| 12 | Urea | 78.2 | 1.57 |
| | Total | 1314.6 | |

In Stage 1, water was combined with NaOH, ethylene glycol and Dow Antifoam 1500 with mixing. The mixture was heated to 70° C. with modest agitation. Soy flour was added to the mixture at 5% of the total soy flour per minute with rapid stirring. The mixture was heated to 90° C. over 15 minutes, and maintained at a temperature of 88-92° C. for 1 hour.

In Stage 2, the mixture was removed from the heat source and charged with formaldehyde (06) over 5 minutes, while maintaining 90° C. for an additional 55 minutes after the addition was complete. Phenol (07) was added to the mixture over 10 minutes and the solution was cooled to 75 C., then NaOH (08) was added. Formaldehyde (09) was added over 10 minutes while maintaining the temperature at 75° C. NaOH (10) was then added, and the mixture held at 75° C. for 5 minutes, then the remaining NaOH (11) was added. After maintaining the mixture at 75° C. for an additional 90 minutes, urea (12) was added over 5 minutes and the temperature was maintained at 75° C. for 90 minutes. The solution was then cooled to 40° C. in a cold water bath over 10-15 minutes and was filtered through a coarse screen Example 44

A dispersion resin was prepared from the resin in Example 43 followed by the addition of extra formaldehyde, resulting in a total molar ratio of formaldehyde/phenol plus urea level of 2.72. This was done by combining components in the order as listed in Table 23 to yield a 50/25/25 Soy/PF/UF resin.

TABLE 23

| Sequence | Ingredient | Amount (g) |
| --- | --- | --- |
| 01 | Resin from Example 43 | 263.8 |
| 02 | Sulfuric Acid | 11.2 |
| 03 | Formaldehyde 37% | 22.0 |
|  | Total |  |

To a 1 liter round bottom flask equipped with an overhead stirrer, thermometer, and condenser, the resin from Example 43 was charged and the agitation was then initiated. The resin solution was allowed to stir for 5 minutes while the temperature was adjusted to 25° C. with a water bath. The condenser was then removed from the flask and the sulfuric acid was added dropwise to the rapidly stirring mixture over a period of 5 minutes. The exotherm was controlled with a water bath and the max temperature was 29° C. The dispersion was allowed to mix for 15 minutes at a temperature of 25° C. Formaldehyde (03) was charged over 5 minutes to the rapidly stirring dispersion. The temperature was increased to 75° C. over 30 minutes and maintained for 1 hr. The dispersion was then filtered through a coarse screen.

As the data of Table 24 demonstrate, the acid dispersions possess lower viscosity and lower resin extractables than the corresponding adhesive from which the dispersion was prepared. The data also demonstrate that higher soy contents can be employed while maintaining acceptable properties of the adhesive dispersion.

TABLE 24

Properties of Soy-Based Alkaline Resins and Acid Dispersions

| Example | % Soy | pH | Solids (%) | Viscosity (cps) | Free $CH_2O$ (%) | Extract (%) |
| --- | --- | --- | --- | --- | --- | --- |
| Conventional Phenol Formaldehyde | 0 | 11.00 | 53.8 | 184/184 | — | 29.1 |
| 36 | 66 | 10.27 | 34.9 | 1054/1296 | — | 31.4 |
| 38 | 66 | 4.31 | 36.0 | 606/764 | — | 30.9 |
| 39 | 66 | 4.27 | 36.0 | 1066/1444 | — | — |
| 40 | 50 | 4.28 | 38.1 | 300/364 | — | 23.0 |
| 41 | 50 | 2.35 | 38.2 | 320/376 | — | — |
| 42 | 60 | 4.20 | 38.0 | 982/1236 | — | 27.1 |
| 43 | 50 | 10.82 | 38.6 | 352/400 | 0.21 | 45.0 |
| 44 | 50 | 4.56 | 37.5 | 178/200 | 0.52 | 37.2 |

Viscosity was measured using a Brookfield Viscometer with LVT#3 spindle at 60 and 30 RPMs, respectively. Solids were determined using a 150° C./1 hour oven solids pan method, except for urea containing the adhesives of Example 43 and Example 44 where a 125° C./90 min oven solids pan method was employed. Gel times were measured using a Sunshine gel meter at 98-100° C. Extract was measured as the amount of resin extracted from a cured oven solids sample after 24 hour Soxhlet water extraction Randomly oriented strand boards were prepared using a conventional phenol formaldehyde resin and the resins of Examples 36 through 42. The panels were prepared to the specifications of Table 11, unless otherwise indicated. In a typical oriented strandboard method, sandwich board was prepared with two face layers and one center core layer. The center core layer represented 45% of the total dry mass of the finished panel. The two outer face layers were of identical size and together comprised the remaining 55% of the total mass. Unless otherwise specified, the core section of all panels contained only commercial phenol formaldehyde resin and commercial wax emulsion.

Two panels were prepared for each resin system under each press time. The panels were measured for density, dry internal bond (ASTM D-1037-99, four samples per panel), 24 hour room temperature thickness swell (ASTM D-1037-99, two samples per panel), 2 hour boil thickness swell (sample measurement and testing per ASTM D-1037-99, two samples per panel). The lower the thickness swell and the higher the internal bond strength (IB), the better the performance of the adhesive. For comparison, all board sets contain panels made from a commercial phenol formaldehyde resin that was prepared using the same pressing cycle and furnish as the soy based resins.

TABLE 25

Properties of Strand Board Panels

| Ex. | Face Resin | % Soy | Press Soak (sec) | Density (lb/ft³) | Ave Board Thickness (mm) | Thickness Swell % 2 hr Boil at 100° C. (one SD) | Thickness Swell % 24 hr Room Temperature (one SD) | Internal Bond (PSI) Dry (one SD) |
| --- | --- | --- | --- | --- | --- | --- | --- | --- |
| — | Conventional Phenol Formaldehyde |  | 150 | 40.2 | 10.89 | 56.6 (9.3) | 33.5 (4.5) | 83.7 (16.6) |
| 45 | Ex. 36 |  | 210 | 40.5 | 10.73 | 53.7 (8.1) | 31.0 (2.9) | 101.5 (17.9) |
| 46 | Ex. 38 |  | 210 | 42.8 | 10.63 | 76.0 (9.9) | 38.0 (1.4) |  |
|  |  |  | 330 | 42.5 | 10.57 | 60.6 (3.4) | 33.7 (2.3) |  |
| 47 | Ex. 39 |  | 210 | 41.9 | 10.76 | 68.0 (2.3) | 40.0 (1.7) | 105.4 (15.1) |
|  |  |  | 330 | 42.0 | 10.69 | 65.6 (9.2) | 38.6 (2.4) | 89.3 (30.5) |

TABLE 25-continued

Properties of Strand Board Panels

| Ex. | Face Resin | % Soy | Press Soak (sec) | Density (lb/ft³) | Ave Board Thickness (mm) | Thickness Swell % 2 hr Boil at 100° C. (one SD) | Thickness Swell % 24 hr Room Temperature (one SD) | Internal Bond (PSI) Dry (one SD) |
|---|---|---|---|---|---|---|---|---|
| 48 | Ex. 40 | | 210 | 43.4 | 10.63 | 64.6 (10.0) | 38.1 (0.7) | 95.4 (20.2) |
| | | | 330 | 42.8 | 10.62 | 55.6 (7.1) | 33.6 (2.6) | 89.1 (26.5) |
| 49 | Ex. 41 | | 210 | 41.8 | 10.75 | 62.8 (13.8) | 35.3 (3.3) | 80.9 (14.0) |
| | | | 330 | 41.6 | 10.73 | 55.9 (10.6) | 32.8 (3.6) | 87.1 (15.8) |
| 50 | Ex 42 | | 210 | 41.7 | 11.09 | 76.9 (6.4) | 17.3 (1.4) | 84.8 (11.1) |
| | | | 330 | 41.1 | 11.10 | 63.0 (8.6) | 15.8 (0.8) | 64.1 (17.6) |

The data of Table 25 demonstrated that a decrease in the viscosity of the adhesive by the addition of acid to form a dispersion can be achieved and still yield a composite panel comparable to the control. Most notably, the excellent thickness swell results even though the control phenol formaldehyde panel was significantly lower in density. The data also demonstrated that higher soy levels can be employed and still yield a composite panel exhibiting satisfactory performance. The addition of 10% pMDI in example 50 resulted in the panel with superior room temperature thickness swell resistance.

Adhesives and methods of preparing and using same are disclosed in co-pending U.S. application Ser. No. 10/211,944 filed Aug. 1, 2002 and entitled "VEGETABLE PROTEIN ADHESIVE COMPOSITIONS" and U.S. application Ser. No. 10/818,714 filed Apr. 5, 2004 and entitled "WATER-RESISTANT VEGETABLE PROTEIN ADHESIVE COMPOSITIONS."

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A method of preparing a protein-based adhesive dispersion, the method comprising the steps of: denaturing a protein, whereby a denatured protein is obtained; methylolating the denatured protein with a formaldehyde source, whereby a methylolated, denatured protein is obtained; copolymerizing the methylolated denatured protein with a comonomer under basic conditions to yield a protein-based adhesive, wherein the comonomer is selected from phenol, phenol formaldehyde, urea, urea formaldehyde, melamine, melamine formaldehyde, melamine urea formaldehyde, and mixtures thereof; and adding an acid to the protein-based adhesive until a pH of less than 6.0 is attained, whereby a protein-based adhesive dispersion is obtained.

2. The method of claim 1, further comprising the step of: reacting the protein-based adhesive with additional formaldehyde under basic conditions.

3. The method of claim 1, further comprising the step of copolymerizing an additional comonomer with the protein-based adhesive in the adhesive dispersion.

4. The method of claim 3, wherein the additional comonomer comprises a polymeric methyl diphenyl diisocyanate or a novolak resin.

5. The method of claim 1, wherein the protein is a component of a soy flour, wherein the soy flour has a particle size of about 80 mesh or less, and wherein the soy flour comprises from about 0 wt. % to about 12 wt. % of an oil and from about 30 wt. % to about 100 wt. % of the protein.

6. The method of claim 1, wherein the step of denaturing comprises the steps of: forming an aqueous, alkaline solution of the protein; and maintaining the solution at an elevated temperature, whereby a denatured protein is obtained.

7. The method of claim 1, wherein the step of methylolating is conducted in a basic solution at a temperature of from about 0° C. to about 100° C.

8. The method of claims 1, wherein the formaldehyde source is formaldehyde, and wherein a total amount of formaldehyde reacted comprises from about 20 wt. % to about 30 wt. % of the total protein content of the flour.

9. The method of claim 1, wherein the adhesive dispersion comprises from about 10 wt. % to about 99 wt. % of the comonomer.

10. The method of claim 1, further comprising the step of: preparing a comonomer at the presence of the methylolated, denatured protein.

11. The method of claim 1, further comprising the steps of: preparing a comonomer; and blending the comonomer with the methylolated, denatured protein.

12. The method of claim 1, wherein the adhesive dispersion has a pH of less than about 6.

13. The method of claim 1, wherein the adhesive dispersion has a solids content of from about 30 wt. % of about 60 wt. %.

14. The method of claim 1, wherein the adhesive dispersion has a cured resin water extraction amount of less than about 45%.

15. An adhesive dispersion comprising an acid and an adhesive, wherein the acid is present in an amount sufficient to obtain a pH less than 6.0, and wherein the adhesive comprises a methylolated protein resulting from reacting a copolymer of a protein having a plurality of methylol groups and at least one comonomer, wherein the comonomer comprises a methylol compound selected from phenol, phenol formaldehyde, urea, urea formaldehyde, melamine, melamine formaldehyde, melamine urea formaldehyde, tetramethylol ketone and mixtures thereof, wherein the dispersion comprises less than 2.5 wt. % of free phenol and less than about 1 wt. % free formaldehyde.

16. The adhesive dispersion of claim 15, wherein the protein is a soy protein, and wherein the soy protein is a component of a soymeal, the soymeal having a soy protein content of from about 40 wt. % about 50 wt. % and an oil content of less than about 11 wt. %.

17. The adhesive dispersion of claim 15, wherein the comonomer is selected from dimethylol phenol, dimethylol urea and trimethylol melamine.

18. The adhesive dispersion of claim 15, further comprising a coreacting prepolymer which reacts to the methylolated protein.

19. The adhesive dispersion of claim 18, wherein the coreacting prepolymer comprises phenol formaldehyde.

* * * * *